(12) United States Patent
Zhang

(10) Patent No.: US 11,928,383 B2
(45) Date of Patent: Mar. 12, 2024

(54) SCREEN PROJECTION CONTROL METHOD, STORAGE MEDIUM AND COMMUNICATION APPARATUS

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventor: Fan Zhang, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 0 days.

(21) Appl. No.: 17/978,452

(22) Filed: Nov. 1, 2022

(65) Prior Publication Data
US 2023/0052877 A1    Feb. 16, 2023

Related U.S. Application Data

(63) Continuation of application No. PCT/CN2022/083932, filed on Mar. 30, 2022.

(51) Int. Cl.
*G06F 3/14* (2006.01)
*G06F 3/041* (2006.01)
(Continued)

(52) U.S. Cl.
CPC ........ *G06F 3/1454* (2013.01); *G06F 3/04162* (2019.05); *G09G 5/14* (2013.01); *H04N 7/15* (2013.01)

(58) Field of Classification Search
CPC ..... G06F 3/1454; G06F 3/04162; G09G 5/14; H04N 7/15
(Continued)

(56) References Cited

U.S. PATENT DOCUMENTS

| 11,079,995 B1* | 8/2021 | Hulbert | ................. G06F 3/0485 |
| 2004/0114030 A1* | 6/2004 | Ohkawa | ................... H04N 7/15 |
| | | | 348/E7.083 |

(Continued)

FOREIGN PATENT DOCUMENTS

| CN | 108920116 A | 11/2018 |
| CN | 110505516 A | 11/2019 |

(Continued)

OTHER PUBLICATIONS

English translation of the International Search Report issued in International application No. PCT/CN2022/083932, dated Jun. 15, 2022.

(Continued)

*Primary Examiner* — Tom V Sheng
(74) *Attorney, Agent, or Firm* — BAYES PLLC

(57) ABSTRACT

A screen projection control method, storage medium and communication apparatus are provided. The screen projection control method includes: a screen projection receiving end receiving screen projection request information from a first screen projection sending end; determining, according to the screen projection request information, whether a third screen projection sending end that has triggered an interference-free mode of screen projection exists in at least one second screen projection sending end that is performing screen projection, wherein enabling the interference-free mode comprises stopping accepting a screen projection request; and if the third screen projection sending end that has enabled the screen projection interference-free mode (Continued)

exists, the screen projection receiving end sending response information for refusing the screen projection request to the first screen projection sending end.

19 Claims, 13 Drawing Sheets

(51) Int. Cl.
    *G09G 5/14*       (2006.01)
    *H04N 7/15*       (2006.01)

(58) Field of Classification Search
    USPC ..................................................... 345/2, 2.2
    See application file for complete search history.

(56) References Cited

U.S. PATENT DOCUMENTS

| | | | | |
|---|---|---|---|---|
| 2007/0136466 A1* | 6/2007 | Etelapera | ................ | G06F 21/84 709/225 |
| 2009/0096860 A1* | 4/2009 | Barreiro | ................... | H04N 7/15 348/E7.083 |
| 2013/0207998 A1* | 8/2013 | Aoki | ....................... | G06F 3/017 345/619 |
| 2014/0376878 A1* | 12/2014 | Nakamura | ............. | G09G 5/001 386/230 |
| 2015/0178227 A1* | 6/2015 | Salmela | ........... | H04N 21/41407 710/72 |
| 2019/0339925 A1* | 11/2019 | Lorenz | ................ | G06Q 30/0272 |
| 2019/0354333 A1* | 11/2019 | Ogiso | ....................... | G09G 5/36 |

FOREIGN PATENT DOCUMENTS

| | | |
|---|---|---|
| CN | 112114761 A | 12/2020 |
| CN | 113360108 A | 9/2021 |
| JP | 2005244332 A | 9/2005 |
| WO | 2016119563 A1 | 8/2016 |

OTHER PUBLICATIONS

Written Opinion of the International Searching Authority issued in International application No. PCT/CN2022/083932, dated Jun. 15, 2022.

* cited by examiner

SCREEN PROJECTION CONTROL METHOD, STORAGE MEDIUM AND COMMUNICATION APPARATUS

CROSS-REFERENCE TO RELATED APPLICATIONS

The present application is a continuation of International Application No. PCT/CN2022/083932, filed on Mar. 30, 2022, which claims the benefit of priority to Chinese Patent Application No. 202110411158.8, filed on Apr. 16, 2021. The entire contents of each of the above-identified applications are expressly incorporated herein by reference.

TECHNICAL FIELD

The present disclosure relates to the field of communication, and more particularly, to a screen projection control method, storage medium and communication apparatus.

BACKGROUND

Screen projection refers to a technology of transmitting information such as a specific picture and sound of one apparatus to another apparatus in a data transmission manner, such as wireless transmission or wired transmission, and displaying the information in real time. Currently, the most common screen projection scenario is to screen-project a specific picture and/or sound of user equipment, such as user's computer or mobile phone to a receiving end such as a TV, a display, an interactive white board or a screen projection box. With the development of technology, the receiving end can support simultaneous screen-projection of a plurality of sending ends, that is, screen projection information of the plurality of sending ends is displayed simultaneously on a display interface of the receiving end. However, in a current screen projection scenario, a problem of disorder of screen projection needs to be solved urgently.

SUMMARY

An embodiment of the present disclosure provides a screen projection control method, storage medium and communication apparatus, which can solve the problem of disorder of screen projection. The technical solution is as follows:

In a first aspect, an embodiment of the present disclosure provides a screen projection control method. The screen projection control method includes a screen projection receiving end receiving screen projection request information from a first screen projection sending end; the screen projection receiving end determining, according to the screen projection request information, whether a third screen projection sending end that has triggered an interference-free mode of screen projection exists in at least one second screen projection sending end that is performing screen projection, wherein the interference-free mode includes stopping accepting a screen projection request; if the third screen projection sending end exists, the screen projection receiving end sending response information for refusing the screen projection request to the first screen projection sending end.

In some embodiments, each connected screen projection sending end corresponds to a piece of first state information, the first state information is used for indicating that a corresponding screen projection sending end is or is not in a screen projecting state, and the method further includes: the screen projection receiving end determining, according to the first state information corresponding to the connected screen projection sending end, the at least one second screen projection sending end in the connected screen projection sending end.

In some embodiments, each connected screen projection sending end corresponds to a piece of second state information, the second state information is used for indicating that a corresponding screen projection sending end has triggered or not triggered the interference-free mode, the connected screen projection sending end includes the at least one second screen projection sending end, and the screen projection receiving end determining whether the third screen projection sending end that has triggered the interference-free mode exists in the at least one second screen projection sending end that is performing screen projection includes: the screen projection receiving end determining, according to the second state information corresponding to the at least one second screen projection sending end, whether the third screen projection sending end that has triggered the interference-free mode exists in the at least one second screen projection sending end.

In some embodiments, the method further includes: if the third screen projection sending end that has triggered the interference-free mode does not exist in the at least one second screen projection sending end, the screen projection receiving end accepting the screen projection request of the first screen projection sending end; the screen projection receiving end receiving screen projection data of the first screen projection sending end and screen projection data of the at least one second screen projection sending end.

In some embodiments, the screen projection receiving end accepting the screen projection request of the first screen projection sending end includes: the screen projection receiving end setting the first state information corresponding to the first screen projection sending end to indicate that the first screen projection sending end is in the screen projecting state; and/or the screen projection receiving end sending response information for accepting the screen projection request to the first screen projection sending end.

In some embodiments, before the screen projection receiving end receiving the screen projection request information from the first screen projection sending end, the method further includes: the screen projection receiving end receiving request information for triggering the interference-free mode from the third screen projection sending end; the screen projection receiving end determining, according to the request information for triggering the interference-free mode, whether the first state information corresponding to the third screen projection sending end indicates that the third screen projection sending end is in the screen projecting state; if the first state information corresponding to the third screen projection sending end indicates that the third screen projection sending end is in the screen projecting state, the screen projection receiving end enabling the interference-free mode.

In some embodiments, each connected screen projection sending end corresponds to a piece of second state information, the second state information is used for indicating that a corresponding screen projection sending end has triggered or not triggered the interference-free mode, the connected screen projection sending end includes the at least one second screen projection sending end, and the screen projection receiving end enabling the interference-free mode further includes: the screen projection receiving end setting the second state information corresponding to the third screen projection sending end to indicate that the third screen projection sending end has triggered the interference-free mode; and/or the screen projection receiving end sending response information indicating that the interference-free mode has been enabled to the third screen projection sending end.

In some embodiments, the method further includes: the screen projection receiving end receiving request information for canceling the interference-free mode from the third screen projection sending end; the screen projection receiving end setting the second state information corresponding to the third screen projection sending end to indicate that the third screen projection sending end has not triggered the interference-free mode.

In some embodiments, the method further includes: the screen projection receiving end determining whether the second state information corresponding to the at least one second screen projection sending end includes second state information indicating that the interference-free mode has been triggered; if the second state information indicating that the interference-free mode has been triggered is not included, the screen projection receiving end exiting the interference-free mode, and sending response information indicating that the interference-free mode has been canceled to the third screen projection sending end; if the second state information indicating that the interference-free mode has been triggered is included, the screen projection receiving end sending response information for refusing to cancel the interference-free mode to the third screen projection sending end.

In a second aspect, an embodiment of the present disclosure provides a screen projection control device. The screen projection control device includes: a transceiver module, configured to receive screen projection request information from a first screen projection sending end; a processing module, configured to determine, according to the screen projection request information, whether a third screen projection sending end that has triggered an interference-free mode of screen projection exists in at least one second screen projection sending end that is performing screen projection, wherein the interference-free mode includes stopping accepting a screen projection request; if the processing module determines that the third screen projection sending end exists, the transceiver module is further configured to send response information for refusing the screen projection request to the first screen projection sending end.

In some embodiments, each connected screen projection sending end corresponds to a piece of first state information, the first state information is used for indicating that a corresponding screen projection sending end is or is not in a screen projecting state, and the processing module is further configured to determine, according to the first state information corresponding to at least one connected screen projection sending end, the at least one second screen projection sending end in the at least one connected screen projection sending end.

In some embodiments, each connected screen projection sending end corresponds to a piece of second state information, the second state information is used for indicating that a corresponding screen projection sending end has triggered or not triggered the interference-free mode, wherein the connected screen projection sending end includes the at least one second screen projection sending end, and the processing module is configured to determine, according to the second state information corresponding to the at least one second screen projection sending end, whether the third screen projection sending end that has triggered the interference-free mode exists in the at least one second screen projection sending end.

In some embodiments, if the third screen projection sending end that has triggered the interference-free mode does not exist in the at least one second screen projection sending end, the processing module is further configured to determine to accept the screen projection request of the first screen projection sending end; the transceiver module is further configured to receive screen projection data of the first screen projection sending end and screen projection data of the at least one second screen projection sending end.

In some embodiments, the processing module is configured to set the first state information corresponding to the first screen projection sending end to indicate that the first screen projection sending end is in the screen projecting state; and/or the transceiver module is further configured to send response information for accepting the screen projection request to the first screen projection sending end.

In some embodiments, before the transceiver module receives the screen projection request information from the first screen projection sending end, the transceiver module is further configured to receive request information for triggering the interference-free mode from the third screen projection sending end; the processing module is further configured to determine, according to the request information for triggering the interference-free mode, whether the first state information corresponding to the third screen projection sending end indicates that the third screen projection sending end is in the screen projecting state; if the first state information corresponding to the third screen projection sending end indicates that the third screen projection sending end is in the screen projecting state, the processing module is further configured to determine to enable the interference-free mode.

In some embodiments, each connected screen projection sending end corresponds to a piece of second state information indicating that a corresponding screen projection sending end has triggered or not triggered the interference-free mode, wherein the connected screen projection sending end includes the at least one second screen projection sending end, and the processing module is configured to set the second state information corresponding to the third screen projection sending end to indicate that the third screen projection sending end has triggered the interference-free mode, and/or the transceiver module is further configured to send response information indicating that the interference-free mode has been enabled to the third screen projection sending end.

In some embodiments, the transceiver module is further configured to receive request information for canceling the interference-free mode from the third screen projection sending end; the processing module is further configured to set, in response to the request information for canceling the interference-free mode, the second state information corresponding to the third screen projection sending end to indicate that the third screen projection sending end has not triggered the interference-free mode.

In some embodiments, the processing module is further configured to determine, in response to the request information for canceling the interference-free mode, whether the second state information corresponding to the at least one second screen projection sending end includes second state information indicating that the interference-free mode has been triggered, if the second state information indicating that the interference-free mode has been triggered is not included, the processing module is further configured to exit the interference-free mode, and the transceiver module is further configured to send response information indicating that the interference-free mode has been canceled to the third screen sending end; if the second state information indicating that the interference-free mode has been triggered is included, the transceiver module is further configured to send response information for refusing to cancel the interference-free mode to the third screen projection sending end.

In a third aspect, an embodiment of the present disclosure provides a computer storage medium. The computer storage medium stores a plurality of instructions adapted to be loaded by a processor and execute steps of the screen projection control method according to any one of the above-described first aspect.

In a fourth aspect, an embodiment of the present disclosure provides a computer program product. The computer program product includes a computer program, wherein the computer program, when executed by a processor, implements the screen projection control method according to any one of the first aspect.

In a fifth aspect, an embodiment of the present disclosure provides an interactive white board or an electronic apparatus. The interactive white board or the electronic apparatus includes: a processor and a memory, wherein the memory stores a computer program, the computer program is adapted to be loaded by the processor and execute steps of the screen projection control method according to any one of the above-described first aspect.

In the embodiment of the present disclosure, after a screen projection sending end that is performing screen projection triggers the interference-free mode, the screen projection receiving end enables the interference-free mode. In the interference-free mode, the screen projection receiving end stops accepting the screen projection request, that is, when other screen projection sending ends request the screen projection, the screen projection receiving end will refuse the screen projection request, and not pop up an inquiry window on the screen. This can solve the problem of disorder of screen projection, so that the screen projection sending end that is performing screen projection is not interfered, and the screen projection is performed in order according to the needs of the sending end.

BRIEF DESCRIPTION OF DRAWINGS

In order to describe the technical solution in the embodiments of the present disclosure or the related art more clearly, the accompanying drawings required in the description of the embodiments or the related art will be briefly introduced below. Obviously, the accompanying drawings in the description below are merely some embodiments of the present disclosure, and for those of ordinary skill in the art, other drawings may be obtained from these drawings without creative efforts.

DETAILED DESCRIPTION

Figure 1:
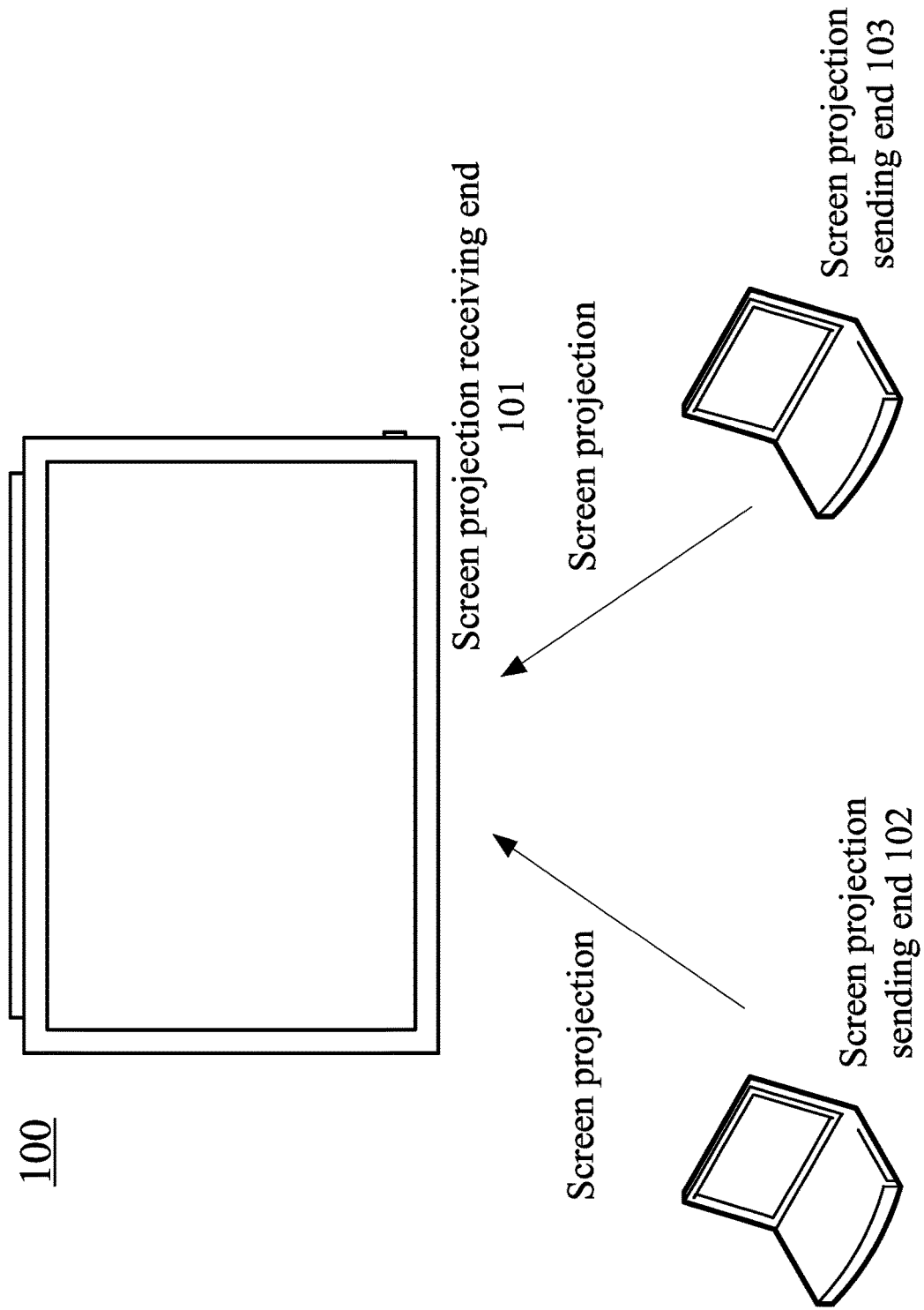
FIG. 1 is a schematic diagram of an application scenario of a screen projection control method according to an embodiment of the present disclosure.

In order to make the purposes, technical solutions, and advantages of the present disclosure more clear, embodiments of the present disclosure are described in further detail below with reference to the accompanying drawings.

It should be clear that the described embodiments are only a part rather than all of the embodiments of the present disclosure. Based on the embodiments of the present disclosure, all other embodiments obtained by those of ordinary skill in the art without creative effort shall fall within the scope of protection of the present disclosure.

When the following description relates to the accompanying drawings, the same numerals in different drawings denote the same or similar elements unless otherwise indicated. The embodiments described in the following exemplary embodiments do not represent all embodiments consistent with the present disclosure. Instead, they are merely examples of devices and methods consistent with some aspects of the present disclosure as detailed in the appended claims.

In the description of the present disclosure, it is to be understood that the terms "first," "second," "third," and the like are only used to distinguish similar objects, but are not necessarily used to describe a specific order or sequence, and can't be understood as indicating or implying relative importance. For those of ordinary skill in the art, the specific meaning of the above terms in the present disclosure may be understood as the case may be. In addition, in the description of the present disclosure, unless otherwise specified, "a plurality of" means two or more. "And/or" describes an association relationship of associated objects, and indicates that three relationships may exist, for example, A and/or B may indicate three cases: A exists alone, A and B exist simultaneously, and B exists alone. The character "/" generally indicates that the associated objects are of an "or" relationship.

The relevant terms involved in the present disclosure will be briefly introduced below.

1. Communication Connection

Communication connection refers to a communication link established after two independently running apparatus (such as a screen projection receiving end apparatus and a screen projection sending end apparatus) or software running separately on the two apparatus exchange identity confirmation information through a communication method such as a wired network or a wireless network, and data is sent to each other through the link.

2. Request and Response

A request refers to a data packet sent by a piece of software (called a requesting party) to another piece of software (called a requested party) through a communication method such as network when a specific operation is performed, and the data packet contains information such as a description of the action. The requested party may determine to accept or refuse the request after performing a specific process, and likewise, send a data packet to the requesting party through a communication method such as network to inform the requesting party of the result, wherein the data packet is referred to as a response.

FIG. 1 is a schematic diagram of an application scenario 100 of a screen projection control method according to an embodiment of the present disclosure.

As shown in FIG. 1, the embodiment of the present disclosure may be applied to a conference scenario 100 including at least one screen projection receiving end, which may also be referred to as a screen projection receiving end apparatus or a receiving end, such as a screen projection receiving end 101 as shown in FIG. 1. The conference scenario 100 may further include at least two screen projection sending ends, which may also be referred to as a screen projection sending end apparatus or a sending end, and the screen projection sending end may be a screen projection sending end 103 and a screen projection sending end 102 as shown in FIG. 1. The screen projection receiving end 101 may establish a communication connection with a plurality of screen projection sending ends. As shown in FIG. 1, the screen projection receiving end 101 may establish a communication connection with the screen projection sending end 103 and the screen projection sending end 102, in which the communication connection may be a wired communication connection or a wireless communication connection, which is not limited in the present disclosure. The screen projection receiving end 101 may receive screen projection information from the screen projection sending end 103 and screen projection information from the screen projection sending end 102. The screen projection information may include screen-projection picture information and/or screen-projection sound information. As shown in FIG. 1, if the screen projection receiving end 101 is configured with a screen, the screen projection receiving end may simultaneously display pictures and sounds from the screen projection sending end 103 and the screen projection sending end 102 on the screen. However, the present disclosure is not limited thereto.

Figure 2:
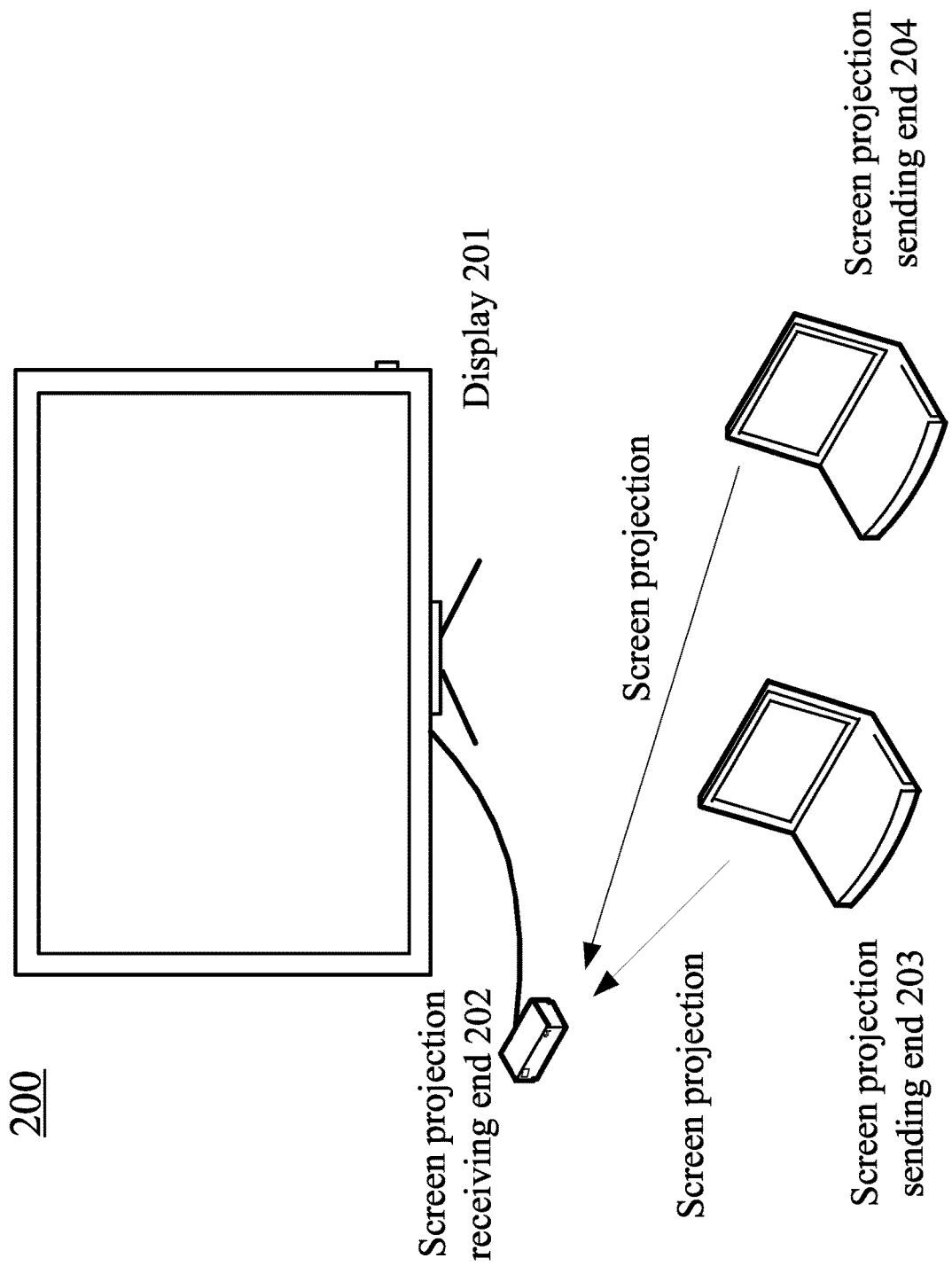
FIG. 2 is another schematic diagram of an application scenario of a screen projection control method according to an embodiment of the present disclosure.

FIG. 2 is a schematic diagram of an application scenario 200 of a screen projection control method according to an embodiment of the present disclosure.

As shown in FIG. 2, a screen projection receiving end 202 may be a screen projection processing device, for example, the screen projection receiving end 202 may be a screen transmission box, but the present disclosure is not limited thereto. The screen projection receiving end 202 may receive screen projection information from a screen projection sending end 203 and a screen projection sending end 204, and forward the screen projection information to a connected display 201 to control the display to display pictures and sounds from the screen projection sending end 203 and the screen projection sending end 204, wherein a communication connection between the screen projection receiving end 202 and the screen projection sending ends and the display may be a wireless communication connection or a wired communication connection, which is not limited in the present disclosure.

A screen projection sending end according to an embodiment of the present disclosure may be a user terminal, which may be a terminal apparatus such as a mobile phone, a tablet or a notebook computer.

A screen projection receiving end according to an embodiment of the present disclosure may be a communication apparatus having a wired communication function or a wireless communication function, such as a TV, a projector, an interactive white board, a computer apparatus, or a screen transmission box.

In the current screen projection scenario, there exists a situation in which the screen projection sending end controls screen projection intentionally or unintentionally, thereby affecting the screen projection effect or affecting the screen projection order. For example, when screen projection is performed by wireless transmission in a conference scenario, a screen projection sending end adjacent to a conference room may be mistakenly connected to a screen projection apparatus of the conference room in conference and execute screen projection, so that a picture may preempt the screen of the conference room in conference, thereby affecting the conference order, and there may exist a problem of information leakage. In some embodiments, the screen projection order may be affected by malicious control of the screen projection. One solution to solve the interference of the screen projection is to send a screen projection request to the screen projection receiving end when the screen projection sending end needs to perform screen projection, and the screen of the screen projection receiving end will pop up a window to inquire whether the screen projection of the sending end is allowed, and if the screen projection is not allowed or timed out, the screen projection of the screen projection sending end fails. However, the inquiry window popped on the screen of the screen projection receiving end has the problem of interfering with the current screen projection picture and obscuring key information, and the user needs to select a corresponding button of the pop-up window for feedback through an input apparatus at the screen projection receiving end, such as a touch screen, a mouse and a remote controller. Therefore, the problem of interfering with the screen projection order still cannot be completely solved.

In order to solve the problem of disorder in the screen projection process, the present disclosure provides a screen projection control method. When a screen projection receiving end executes a screen projection task, if a screen projection sending end that is performing screen projection triggers an interference-free mode, the screen projection receiving end enables the interference-free mode. In the interference-free mode, the screen projection receiving end stops accepting the screen projection request, that is, when other screen projection sending ends request the screen projection, the screen projection receiving end will refuse the screen projection request, and not pop up an inquiry window on the screen. This can solve the problem of disorder of screen projection, so that a sending end that is performing screen projection is not interfered, and the screen projection is performed in order according to the needs of the sending end.

The screen projection control method according to the embodiment of the present disclosure will be introduced in detail below with reference to the accompanying drawings.

Embodiment 1

Figure 3:
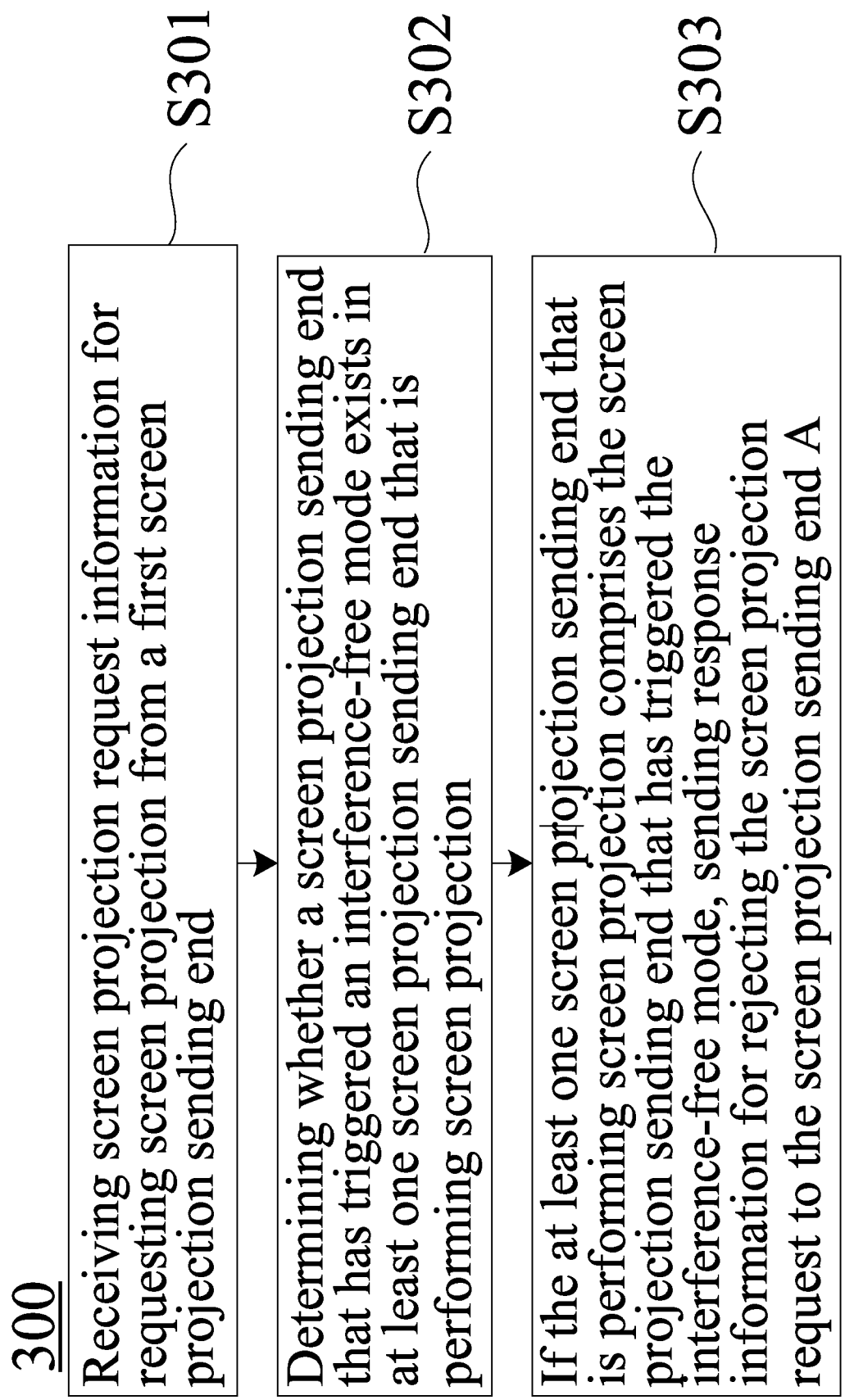
FIG. 3 is a schematic flowchart of a screen projection control method according to an embodiment of the present disclosure.

FIG. 3 is a schematic flowchart of a screen projection control method 300 disclosed in an embodiment of the present disclosure. The method may be executed by a screen projection receiving end, and the method including the following steps:

S301. The screen projection receiving end receiving screen projection request information from a screen projection sending end A.

The screen projection sending end A sends the screen projection request information to the screen projection receiving end in response to a screen projection request operation of a user.

S302: The screen projection receiving end determining whether a screen projection sending end that has triggered a screen projection interference-free mode exists in at least one screen projection sending end that is performing screen projection.

The screen projection receiving end is providing a screen projection service for the at least one screen projection sending end. The screen projection service provided by the screen projection receiving end includes outputting interface display information, and the interface display information may include screen projection data of each screen projection sending end that is performing screen projection.

Wherein the screen projection receiving end outputting the interface display information may be the screen projection receiving end displaying information on a screen display interface or the screen projection receiving end sending the interface display information to a display.

For example, when the screen projection receiving end may be an apparatus configured with a screen (a display screen) such as a television, a tablet computer, or an interactive white board, the screen projection receiving end outputting the interface display information may be controlling the screen to display the interface display information, but the present disclosure is not limited thereto. For example, the screen of the screen projection receiving end displays screen projection data, such as pictures and/or sounds, of at least one screen projection sending end that is performing screen projection.

For another example, when the screen projection receiving end is an apparatus such as a computer host or a screen projection box, the screen projection receiving end outputting the interface display information may be sending interface information to a display connected to the screen projection receiving end, and controlling the display to display the interface information, but the present disclosure is not limited thereto. For example, the screen projection receiving end controls the display to display screen projection data, such as pictures and/or sounds, of at least one screen projection sending end that is performing screen projection.

In response to the screen projection request information of the screen projection sending end A, the screen projection receiving end determines in S302 whether a screen projection sending end that has triggered a screen projection interference-free mode exists in screen projection sending ends that are performing screen projection.

S303: If the at least one screen projection sending end that is performing screen projection includes the screen projection sending end that has triggered the interference-free mode, sending response information for refusing the screen projection request to the screen projection sending end A.

If the at least one screen projection sending end that is performing screen projection includes the screen projection sending end that has triggered the interference-free mode, the screen projection receiving end is in the interference-free mode. Since the screen projection receiving end does not accept the screen projection request in the interference-free mode, the screen projection receiving end sends the response information for refusing the screen projection request to the screen projection sending end A.

If the at least one screen projection sending end that is performing screen projection does not include the screen projection sending end that has triggered the interference-free mode, the screen projection receiving end is not in the interference-free mode, and the screen projection receiving end accepts the screen projection request of the screen projection sending end A and simultaneously receives screen projection data from the screen projection sending end A and screen projection data from the at least one screen projection sending end that is performing screen projection. That is, the screen projection receiving end provides a screen projection service for a plurality of screen projection sending ends, and the output interface display information includes the screen projection data of the screen projection sending end A and the screen projection data of the at least one screen projection sending end that is performing screen projection.

For example, the screen projection receiving end is an interactive white board, and the screen projection receiving end displays screen projection data of a plurality of screen projection sending ends, which includes the screen projection data of the screen projection sending end A, on the screen after accepting the screen projection request of the screen projection sending end A. However, the present disclosure is not limited thereto.

For another example, the screen projection receiving end is a screen projection box, and after accepting the screen projection request of the screen projection sending end A, the screen projection box outputs interface display information to the display, wherein the interface display information includes the screen projection data of the plurality of screen projection sending ends, including the screen projection data of the screen projection sending end A. The screen projection data of the plurality of screen projection sending ends is displayed by the display. However, the present disclosure is not limited thereto.

In some embodiments, the screen projection receiving end accepting the screen projection request of the screen projection sending end A includes: the screen projection receiving end sending response information for accepting the screen projection request to the screen projection sending end A.

After receiving the response information for accepting screen projection request, the screen projection sending end A sends the screen projection data to the screen projection receiving end.

According to the above solution, the screen projection receiving end stops accepting the screen projection request in the interference-free mode, that is, when other screen projection sending ends request the screen projection, the screen projection receiving end will refuse the screen projection request, and not pop up an inquiry window on the screen. This can solve the problem of disorder of screen projection, so that the screen projection sending end that is performing screen projection is not interfered.

Embodiment 2

Figure 4:
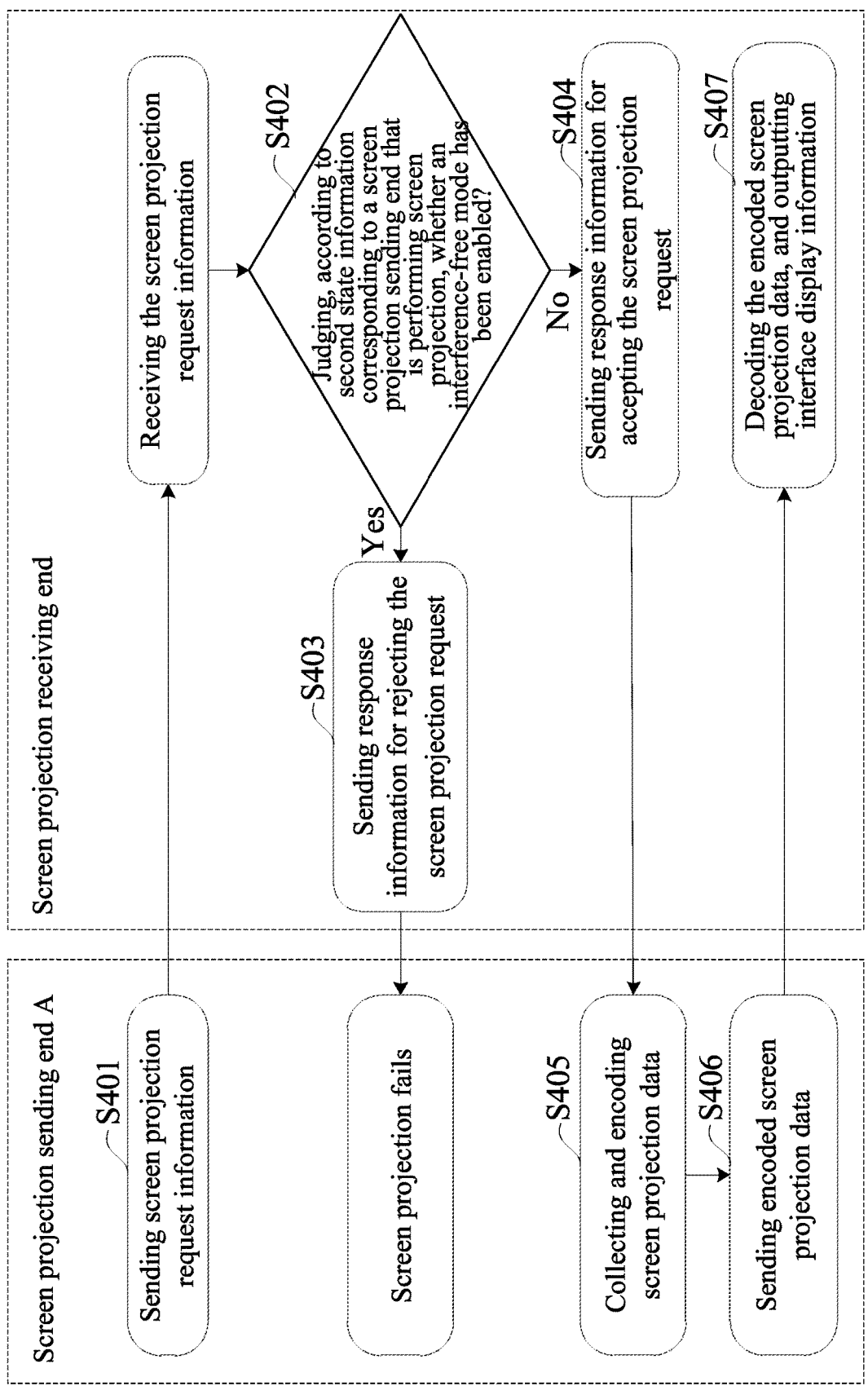
FIG. 4 is another schematic flowchart of a screen projection control method according to an embodiment of the present disclosure.

FIG. 4 is another schematic flowchart of a screen projection control method 400 disclosed in an embodiment of the present disclosure. The method includes the following steps:

S401. Screen projection sending end A sending screen projection request information to a screen projection receiving end.

Accordingly, the screen projection receiving end receives the screen projection request information.

S402. The screen projection receiving end judging, according to second state information corresponding to a screen projection sending end that is performing screen projection, whether an interference-free mode has been enabled.

In an implementation, each screen projection sending end (referred to as a connected screen projection sending end) that establishes a communication connection with the screen projection receiving end corresponds to a piece of second state information, and second state information is used for indicating that a corresponding screen projection sending end has triggered the interference-free mode or has not triggered the interference-free mode.

In some embodiments, after establishing a connection with a screen projection sending end, the screen projection receiving end will initialize the second state information of the screen projection sending end to indicate that the screen projection sending end has not triggered the interference-free mode. If a connected screen projection sending end triggers the interference-free mode, the screen projection receiving end sets the second state information corresponding to the screen projection sending end to indicate that the screen projection sending end has triggered the interference-free mode.

In one example, the second state information may indicate, through a flag bit, whether the corresponding screen projection sending end has triggered the interference-free mode.

For example, the flag bit may indicate "0" or "1," when the flag bit shows "0," it indicates that the corresponding screen projection sending end has not triggered the interference-free mode, and when the flag bit shows "1," it indicates that the corresponding screen projection sending end has triggered the interference-free mode. Or conversely, when the flag bit shows "1," it indicates that the corresponding screen projection sending end has not triggered the interference-free mode, and when the flag bit shows "0," it indicates that the corresponding screen projection sending end has triggered interference-free mode. However, the present disclosure is not limited thereto.

For another example, the flag bit may respectively indicate that the corresponding screen projection sending end has triggered or has not triggered the interference-free mode by indicating "true" or "false," but the present disclosure is not limited thereto.

In S402, the screen projection receiving end may judge second state information corresponding to each screen projection sending end that is performing screen projection, and if the second state information corresponding to one screen projection sending end that is performing screen projection indicates that the interference-free mode has been triggered, the screen projection receiving end has enabled the interference-free mode, and S403 is executed.

S403. The screen projection receiving end sending response information for refusing the screen projection request to the screen projection sending end A.

Accordingly, the screen projection sending end A receives the response information for refusing the screen projection request from the screen projection receiving end, and determines that the screen projection fails.

If in S402, the screen projection receiving end determine that the second state information corresponding to each screen projection sending end that is performing screen projection indicates that the interference-free mode is not triggered, that is, the second state information corresponding to the at least one screen projection sending end that is performing screen projection does not include the second state information indicating that the interference-free mode has been triggered, the screen projection receiving end has not enabled the interference-free mode, the screen projection receiving end accepts the screen projection request of the screen projection sending end A, and S404 is executed.

S404. The screen projection receiving end sending response information for accepting the screen projection request to the screen projection sending end A.

Accordingly, the screen projection sending end A receives the response information for accepting the screen projection request from the screen projection receiving end, and determines that the screen projection request is successful.

S405. The screen projection sending end A collecting and encoding screen projection data.

After receiving the response information for accepting the screen projection request from the screen projection receiving end, the screen projection sending end A collects the screen projection data (for example, collects a screen projection picture and/or a screen projection sound), and encodes the screen projection data to obtain encoded screen projection data.

S406. The screen projection sending end A sending the encoded screen projection data to the screen projection receiving end.

S407. The screen projection receiving end decoding the received encoded screen projection data, and outputting interface display information.

The interface display information includes screen projection data of the screen projection sending end A.

According to the above solution, the screen projection receiving end maintains the second state information corresponding to the connected screen projection sending end, and determines, according to the second state information of the screen projection sending end that is performing screen projection, whether the screen projection receiving end is in the interference-free mode. If in the interference-free mode, the screen projection receiving end stops accepting the screen projection request, that is, when other screen projection sending ends request the screen projection, the screen projection receiving end will refuse the screen projection request, and not pop up an inquiry window on the screen. This can solve the problem of disorder of screen projection, so that a sending end that is performing screen projection is not interfered.

Embodiment 3

Figure 5:
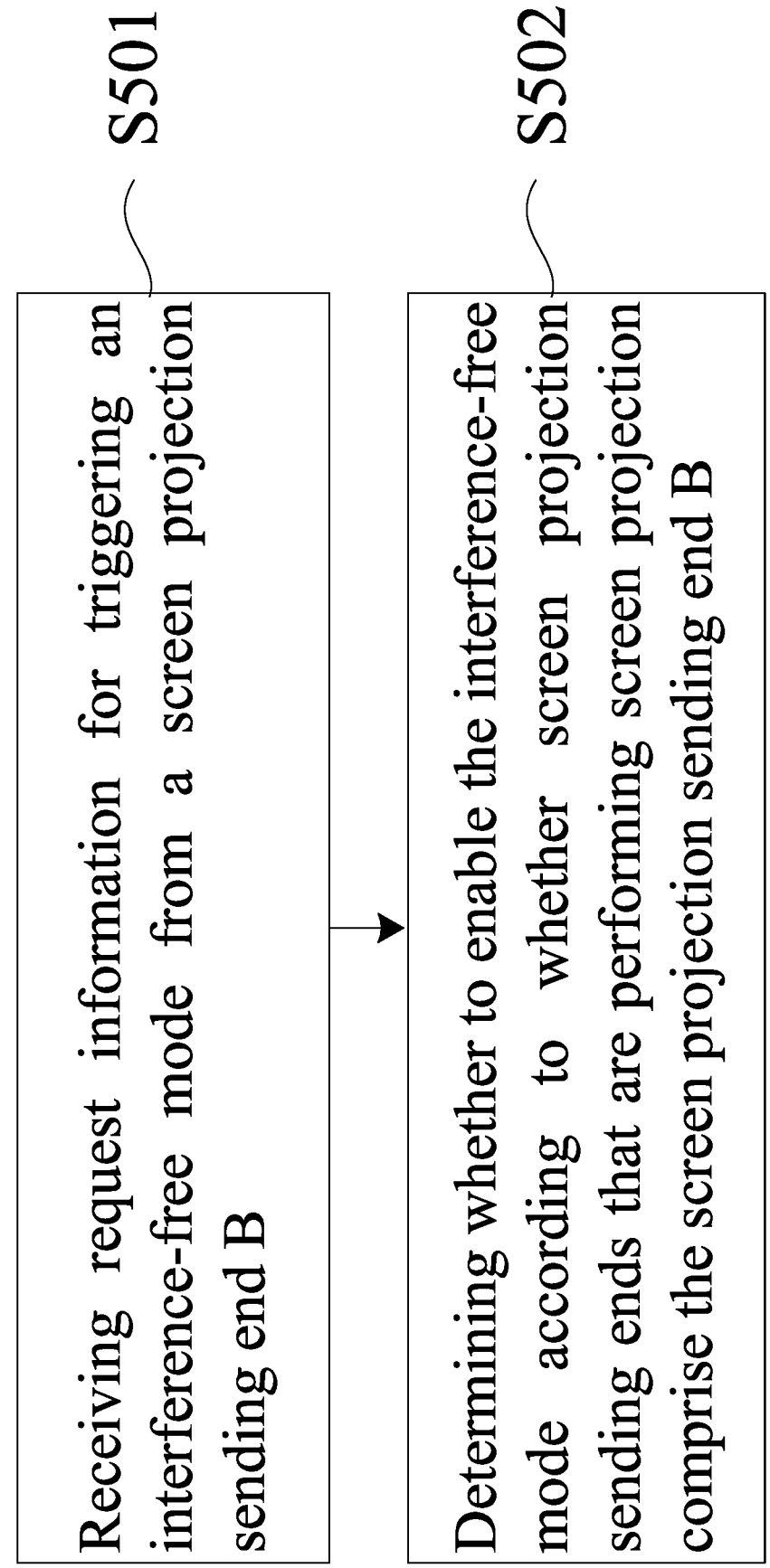
FIG. 5 is another schematic flowchart of a screen projection control method according to an embodiment of the present disclosure.

FIG. 5 is another schematic flowchart of a screen projection control method 500 disclosed in an embodiment of the present disclosure. The method shown in FIG. 5 may be executed by a screen projection receiving end, the method including the following steps:

S501. A screen projection receiving end receiving request information for triggering an interference-free mode from a screen projection sending end B.

In response to an operation of triggering the interference-free mode by a user, the screen projection sending ending B sends the request information for triggering the interference-free mode to the screen projection receiving end.

S502. The screen projection receiving end determining whether to enable the interference-free mode according to whether screen projection sending ends that are performing screen projection include the screen projection sending end B.

If the screen projection sending ends that are performing screen projection include the screen projection sending end B, the screen projection receiving end enables the interference-free mode, and the screen projection receiving end stops accepting the screen projection request; and if the screen projection sending ends that are performing screen projection do not include the screen projection sending end B, the screen projection receiving end sends response information for refusing to enable the interference-free mode to the screen projection sending end B.

Wherein the screen projection receiving end stopping accepting the screen projection request may include: the screen projection receiving end not receiving screen projection request information from the screen projection sending end, or the screen projection receiving end refusing to accept the screen projection request after receiving the screen projection request information from the screen projection sending end. The screen projection receiving end stops receiving the screen projection request after enabling the interference-free mode, which avoids popping up, on the screen, inquiry information inquiring whether screen projection is allowed, and can achieve the effect of avoiding interference with screen projection without the user's feeling.

According to the above solution, the screen projection receiving end judges whether the screen projection sending end triggering the interference-free mode is the screen projection sending end that is performing screen projection, and if it is the screen projection sending end that is performing screen projection, the screen projection receiving end accepts the request of the screen projection sending end, and enables the interference-free mode to avoid interference with the screen projection. If it is not the sending end that is performing screen projection, the screen projection receiving end refuses to enable the interference-free mode, which can avoid a mistakenly connected screen projection sending end or maliciously preempted screen projection sending end preempting the screen projection or maliciously controlling the screen projecting state.

Embodiment 4

Figure 6:
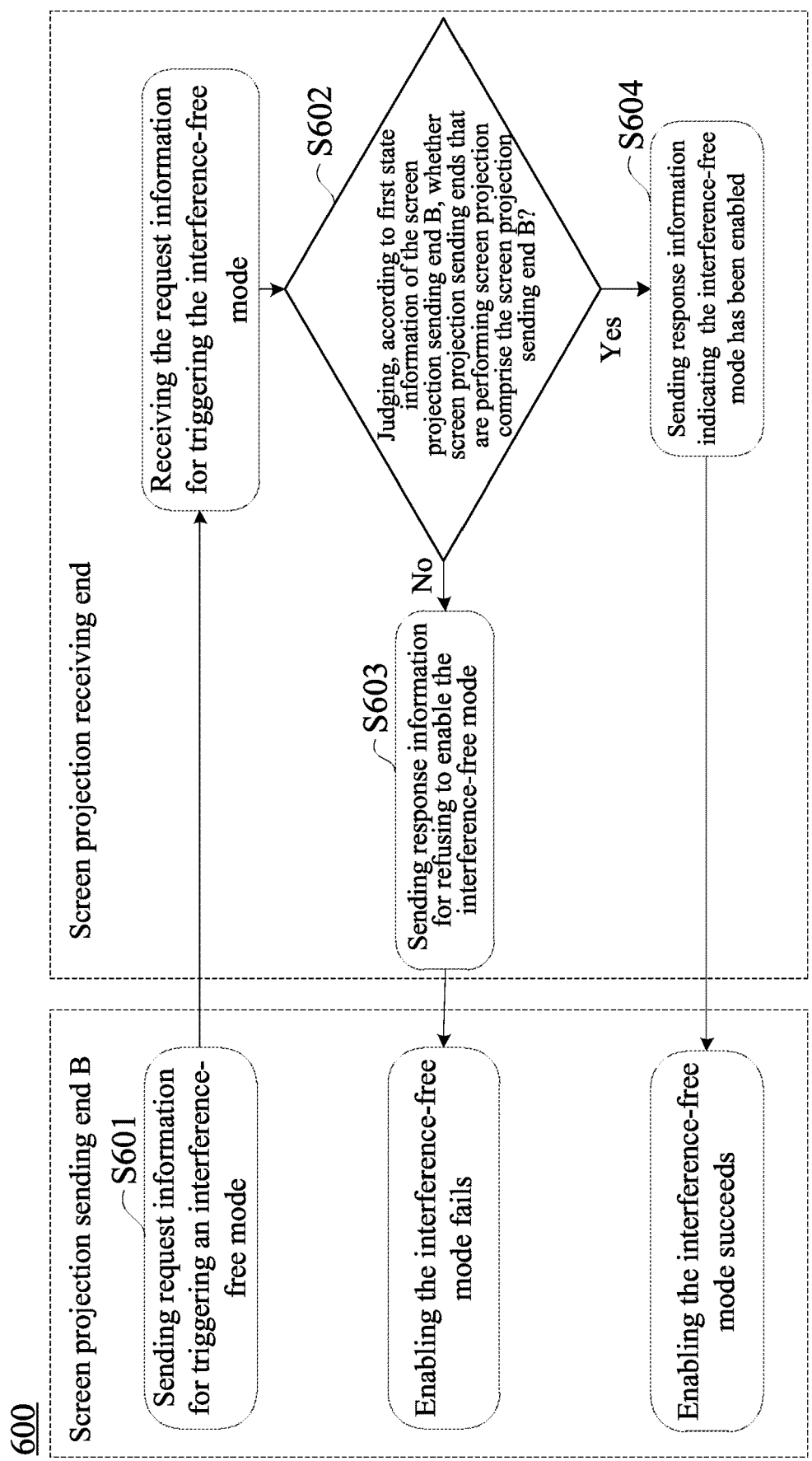
FIG. 6 is another schematic flowchart of a screen projection control method according to an embodiment of the present disclosure.

FIG. 6 is another schematic flowchart of a screen projection control method 600 disclosed in an embodiment of the present disclosure. The method includes the following steps:

S601: Screen projection sending end B sending request information for triggering an interference-free mode to a screen projection receiving end.

Accordingly, the screen projection receiving end receives the request information for triggering the interference-free mode from the screen projection sending end B.

S602: The screen projection receiving end judging, according to first state information corresponding to the screen projection sending end B, whether screen projection sending ends that are performing screen projection include the screen projection sending end B.

Each screen projection sending end (referred to as a connected screen projection sending end) that establishes a communication connection with the screen projection receiving end corresponds to a piece of first state information, and the first state information is used for indicating that whether a corresponding screen projection sending end is in a screen projecting state or in a non-screen projecting state. That is, first state information corresponding to the sending end that is performing screen projection indicates that the sending end is in the screen projecting state, and first state information corresponding to the sending end that is not performing screen projection indicates that the sending end is in the non-screen projecting state.

In an implementation, after establishing a connection with one screen projection sending end, the screen projection receiving end will initialize the first state information of the screen projection sending end to indicate that the screen projection sending end is in the non-screen projecting state. If the screen projection receiving end accepts the screen projection request of the screen projection sending end and provides a screen projection service for the screen projection sending end, the screen projection receiving end sets the first state information corresponding to the screen projection sending end to indicate that the screen projection sending end is in the screen projecting state.

In this embodiment, first state information corresponding to each screen projection sending end of the plurality of screen projection sending ends that are performing screen projection indicates that the screen projection sending end is in the screen projecting state, while first state information of other screen projection sending ends that are not performing screen projection indicates that the screen projection sending ends are in the non-screen projecting state. Therefore, in S602, the screen projection receiving end may judge, according to the first state information of the screen projection sending end B, whether the screen projection sending ends that are performing screen projection include the screen projection sending end B.

If the first state information corresponding to the screen projection sending end B indicates that the screen projection sending end B is in the non-screen projecting state, the screen projection receiving end may determine that the screen projection sending ends that are performing screen projection do not include the screen projection sending end B, and executes S603, so as to notify the screen projection sending end B that the screen projection receiving end refuses to enable the interference-free mode.

S603. The screen projection receiving end sending response information for refusing to enable the interference-free mode to the screen projection sending end B.

Accordingly, the screen projection sending end B receives the response information for refusing to enable the interference-free mode from the screen projection receiving end, and determines that triggering the interference-free mode fails.

If in S602, the screen projection receiving end determines that the first state information corresponding to the screen projection sending end B indicates that the screen projection sending end B is in the screen projecting state, the screen projection receiving end may determine that the screen projection sending ends that are performing screen projection includes the screen projection sending end B, and therefor enable the interference-free mode in response to the request for triggering the interference-free mode from the screen projection sending end B, and execute S604.

S604. The screen projection receiving end sending response information indicating that the interference-free mode has been enabled to the screen projection sending end B.

Accordingly, the screen projection sending end B receives the response information indicating that the interference-free mode has been enabled from the screen projection receiving end, and determines that the interference-free mode is enabled successfully.

In one example, the first state information may indicate, by a flag bit, whether the corresponding screen projection sending end is in the screen projecting state.

For example, the flag bit may indicate "0" or "1," when the flag bit shows "0," it indicates that the corresponding screen projection sending end is in the non-screen projecting state, and when the flag bit shows "1," it indicates that the corresponding screen projection sending end is in the screen projecting state. Or conversely, when the flag bit shows "1," it indicates that the corresponding screen projection sending end is in the non-screen projecting state, and when the flag bit shows "0," it indicates that the corresponding screen projection sending end is in the screen projecting state. However, the present disclosure is not limited thereto.

For another example, the flag bit may respectively indicate that the corresponding screen projection sending end is or is not in the screen projecting state by indicating "true" or "false." However, the present disclosure is not limited thereto.

In an implementation of the present disclosure, Embodiment 2 may be implemented in combination with Embodiment 4. After the screen projection receiving end receives the screen projection request from the screen projection sending end A, the screen projection receiving end may determine, according to first state information corresponding to connected screen projection sending ends, a screen projection sending end that is performing screen projection in the connected screen projection sending ends, that is, the corresponding first state information indicates that a screen projection sending end in the screen projecting state is the sending end that is performing screen projection; and then determine, according to second state information corresponding to the screen projection sending end that is performing screen projection, whether the interference-free mode has been enabled. Therefore, if the first state information corresponding to one screen projection sending end of the screen projection sending ends connected with the screen projection receiving end indicates that the screen projection sending end is in the screen projecting state, and the corresponding second state information indicates that the interference-free mode has been triggered, the screen projection receiving end is in the interference-free mode, and the screen projection receiving end refuses the screen projection request of the screen projection sending end A; if the second state information corresponding to at least one screen projection sending end for which the corresponding first state information indicates to be in the screen projection state of the connected screen projection sending ends indicates that the interference-free mode is not triggered, the screen projection receiving end is not in the interference-free mode, and the screen projection receiving end accepts the screen projection request of the screen projection sending end A, but the present disclosure is not limited thereto.

Embodiment 5

Figure 7:
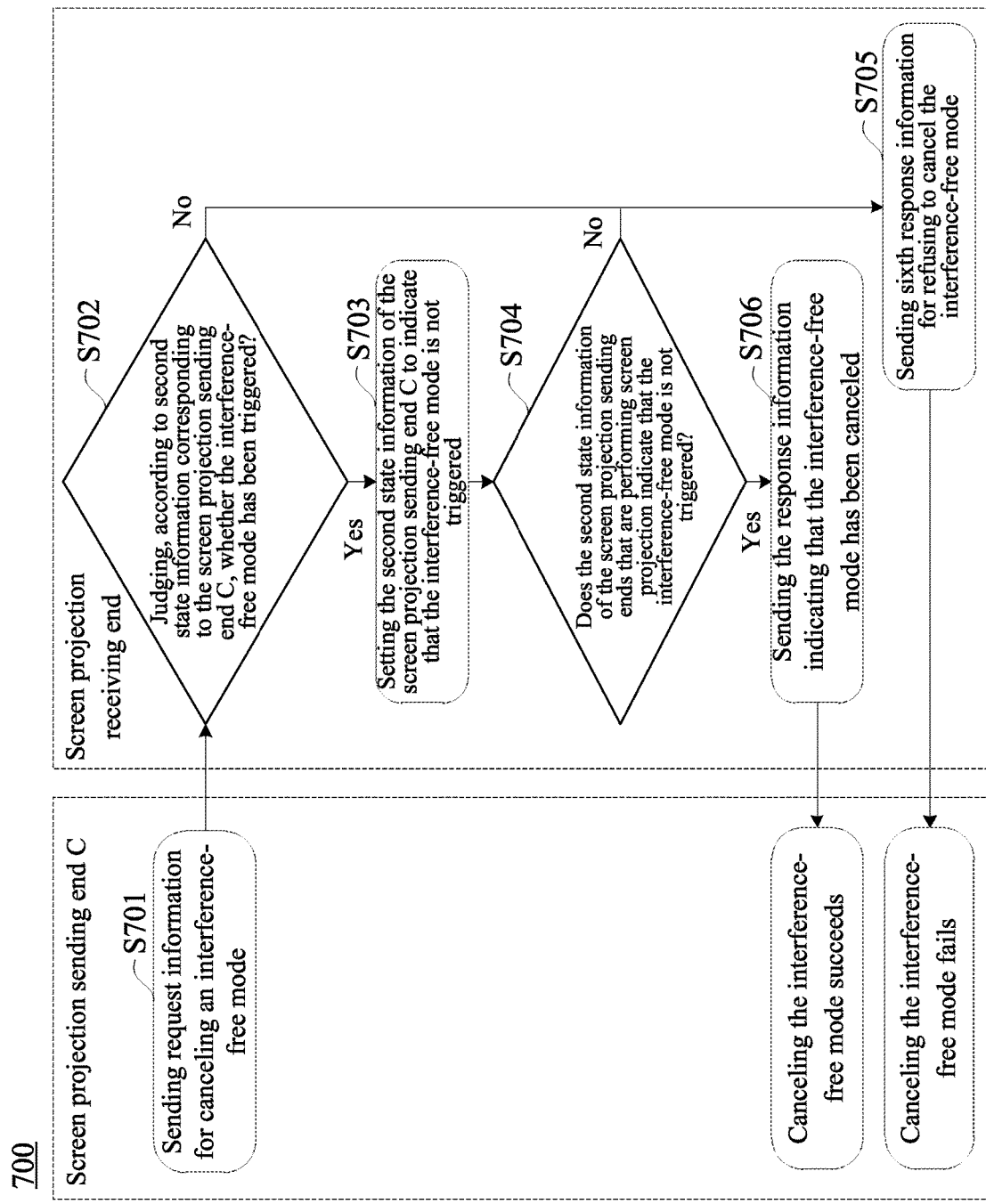
FIG. 7 is another schematic flowchart of a screen projection control method according to an embodiment of the present disclosure.

FIG. 7 is another schematic flowchart of a screen projection control method 700 disclosed in an embodiment of the present disclosure. The method includes the following steps:

S701. A screen projection sending end C sending request information for canceling an interference-free mode to a screen projection receiving end.

Accordingly, the screen projection receiving end receives the request information for canceling the interference-free mode from the screen projection sending end C, and determines that the screen projection sending end requests to cancel the interference-free mode.

S702. The screen projection receiving end judging, according to second state information corresponding to the screen projection sending end C, whether the screen projection sending end C has triggered the interference-free mode.

In some embodiments, if the second state information corresponding to the screen projection sending end C indicates that the screen projection sending end C has triggered the interference-free mode, S703 is executed. If the second state information corresponding to the screen projection sending end C indicates that the screen projection sending end C has not triggered the interference-free mode, S705 is executed.

S703. The screen projection receiving end setting the second state information corresponding to the screen projection sending end C to indicate that the interference-free mode is not triggered.

In response to the request for canceling the interference-free mode from the screen projection sending end C, the screen projection receiving end sets the second state information of the screen projection sending end C to indicate that the interference-free mode is not triggered.

S704. The screen projection receiving end judging whether the second state information corresponding to all screen projection sending ends that are performing screen projection indicates that the interference-free mode is not triggered.

In some embodiments, if second state information corresponding to at least one screen projection sending end included in the screen projection sending ends that are performing screen projection indicates that the interference-free mode has been triggered, S705 is executed. When other screen projection sending ends included in the screen projection sending ends that are performing screen projection trigger the screen projection receiving end to enable the interference-free mode, the screen projection receiving end meets the needs of the other screen projection sending ends, and will refuse the request for canceling the interference-free mode from the screen projection sending end C. If all the second state information corresponding to the screen projection sending ends that are performing screen projection indicates that the interference-free mode has not been triggered, S706 is executed.

In some embodiments, the screen projection sending end determines, according to first state information corresponding to connected screen projection sending ends, a screen projection sending end that is performing screen projection in the connected screen projection sending ends.

S705. The screen projection receiving end sending response information for refusing to cancel the interference-free mode to the screen projection sending end C.

Accordingly, after receiving the response information for refusing to cancel the interference-free mode from the screen projection receiving end, the screen projection sending end C determines that canceling the interference-free mode fails.

S706. The screen projection receiving end sending response information indicating that the interference-free mode has been canceled to the screen projection sending end C.

Accordingly, after receiving the response information from the screen projection receiving end, the screen projection sending end C determines that the interference-free mode is canceled successfully.

Embodiment 6

Figure 8:
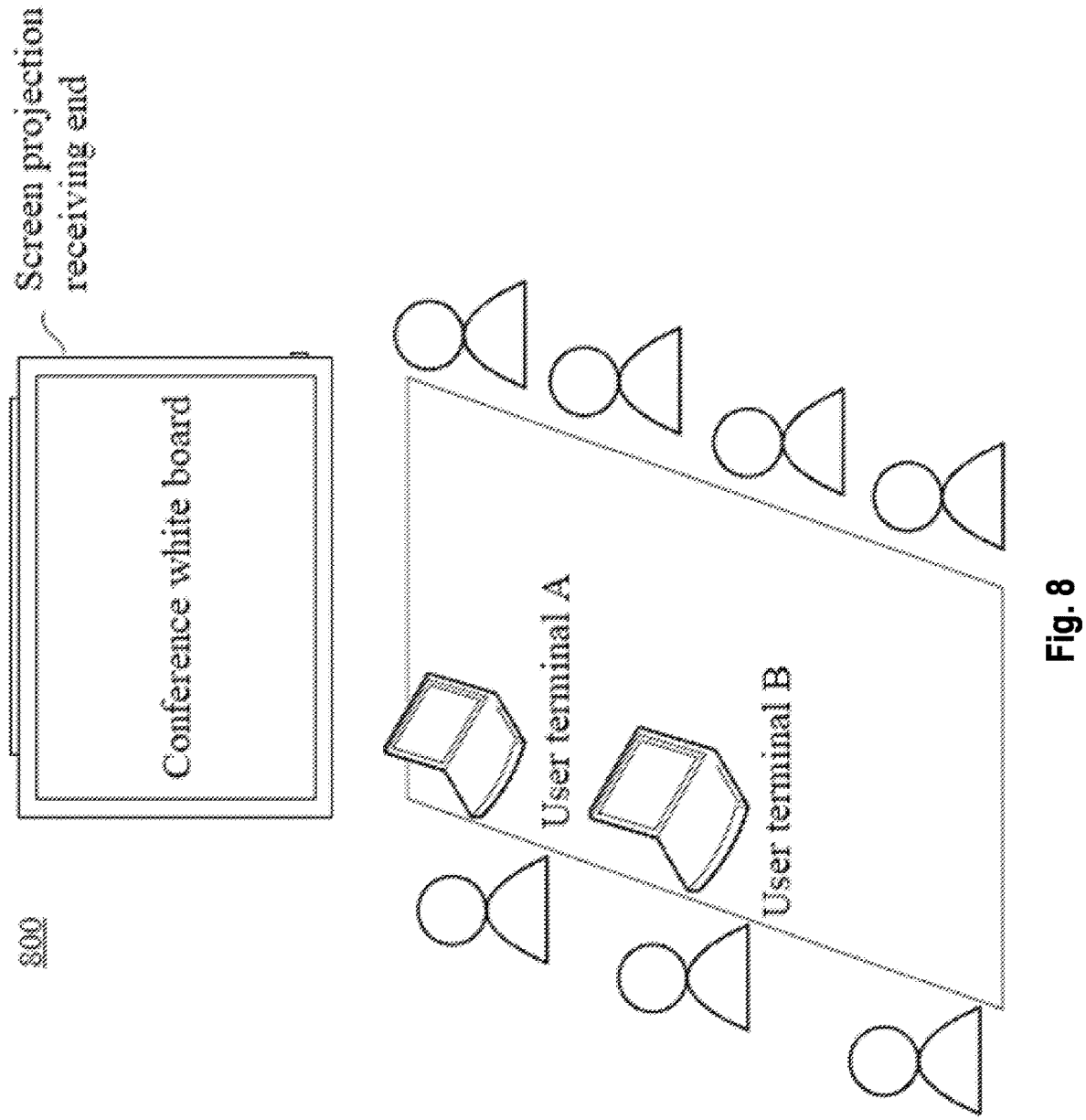
FIG. 8 is a schematic diagram of a conference scenario according to an embodiment of the present disclosure.

FIG. 8 is a schematic diagram of a conference scenario 800 according to an embodiment of the present disclosure.

As shown in FIG. 8, a conference white board is a screen projection receiving end, and when the conference white board runs an application program corresponding to the screen projection receiving end, it can provide a screen projection service for a screen projection sending end. The conference scenario 800 further includes user terminals A and B that may serve as a screen projection sending end. The user terminals may implement screen projection by running an application program corresponding to the screen projection sending end.

In the conference scenario 800, the user, the user terminals, and the conference white board may perform the following operations:

1. The conference white board runs the application program corresponding to the screen projection receiving end, the user terminal A and the user terminal B run the application program corresponding to the screen projection sending end, and the user terminal A and the user terminal B establish a communication connection with the conference white board successively.

2. The conference white board initializes first state information and second state information corresponding to the user terminal A and the user terminal B, respectively.

In the embodiment, take the first state information and the second state information as a flag bit A and a flag bit B respectively as an example for description. Wherein the flag bit A is "true," indicating that a corresponding screen projection sending end is in a screen projecting state; the flag bit A is "false," indicating that a corresponding screen projection sending end is in a non-screen projecting state. The flag bit B is "true," indicating that the corresponding screen projection sending end has triggered an interference-free mode; the flag bit B is "false," indicating that the corresponding screen projection sending end has not triggered the interference-free mode.

The conference white board sets the flag bit A, the flag bit B corresponding to the user terminal A to be false, sets the flag bit A, the flag bit B corresponding to the user terminal B to be false, and stores the flag bit A and the flag bit B of the user terminal A and the user terminal B.

Figure 9:
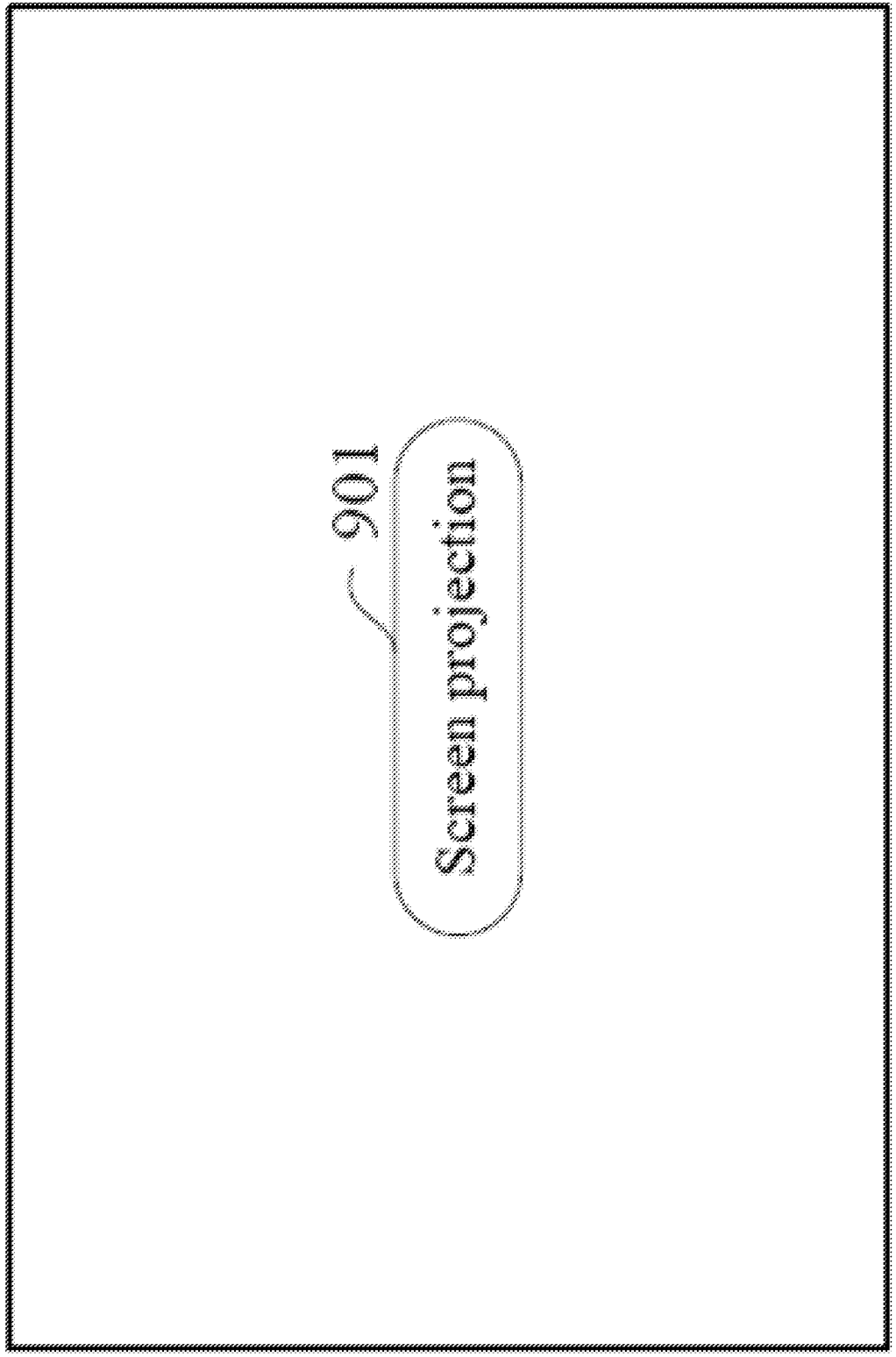
FIG. 9 is a schematic diagram of a user interface according to an embodiment of the present disclosure.

After the user terminal establishes a connection with the conference white board, the user terminal displays a user interface of the screen projection sending end. As shown in FIG. 9, the user interface of the application program of the screen projection sending end may include a second element 901 for requesting screen projection. For example, as shown in FIG. 9, "Screen Projection" may be displayed on the second element, but the present disclosure is not limited thereto.

It should be noted that all the user interfaces shown in the drawings of the present disclosure are schematic diagrams of user interfaces, and the shape, position and the like of each function element on the user interface are not limited in the present disclosure.

3. A user performs a second operation on the second element in the user interface A of the user terminal A, and after receiving the second operation, the user terminal A sends, in response to the second operation, screen projection request information to the conference white board.

4. After receiving the screen projection request, the conference white board judges whether it is in the interference-free mode.

The conference white board reads the flag bits B corresponding to connected screen projection sending ends. The currently connected screen projection sending ends are the user terminal A and the user terminal B, and the flag bits B respectively corresponding to the user terminal A and the user terminal B are both false. The conference white board determines that it is not in the interference-free mode, and accepts a screen projection request of the user terminal A.

5. The conference white board sets the flag bit A of the user terminal A to be true, and sends response message for accepting the screen projection request to the user terminal A to notify the user terminal A that the screen projection request has been accepted.

6. The user terminal A sends screen projection data to the conference white board, and the conference white board displays the screen projection data of the user terminal A on the screen of the conference white board after receiving the screen projection data.

7. The user terminal B sends a screen projection request to the conference white board, and after receiving the screen projection request, the conference white board judges whether it is in the interference-free mode.

The flag bits B corresponding to the connected screen projection sending ends (i.e., the user terminal A and the user terminal B) read by the conference white board are both false. Therefore, the conference white board accepts a screen projection request of the user terminal B. The conference white board sets the flag bit A of the user terminal B to be true, and sends fifth response information to the user terminal B to notify the user terminal B that the screen projection request has been accepted. Then the user terminal B sends screen projection information to the conference white board, and the conference white board displays the screen projection information of the user terminal B on the screen of the conference white board after receiving the screen projection information. At this time, the user terminal A and the user terminal B jointly project screens onto the conference white board, and the conference white board displays, on the screen, the screen projection information of the user terminal A and the screen projection data of the user terminal B in the form of split screens. For example, the conference may be used to discuss and compare the task completion of the user terminal A and the user terminal B. However, the present disclosure is not limited thereto. At this time, in order to avoid other apparatus from interfering the conference, the user terminal may request to enable the interference-free mode.

8. The user performs a first operation on a first element in the user interface A of the user terminal A, wherein the first element is used to enable an interference-free mode. After the user terminal A receives the first operation, the user terminal A sends, in response to the first operation, request information for triggering the interference-free mode to the conference white board to trigger the interference-free mode.

Figure 10:
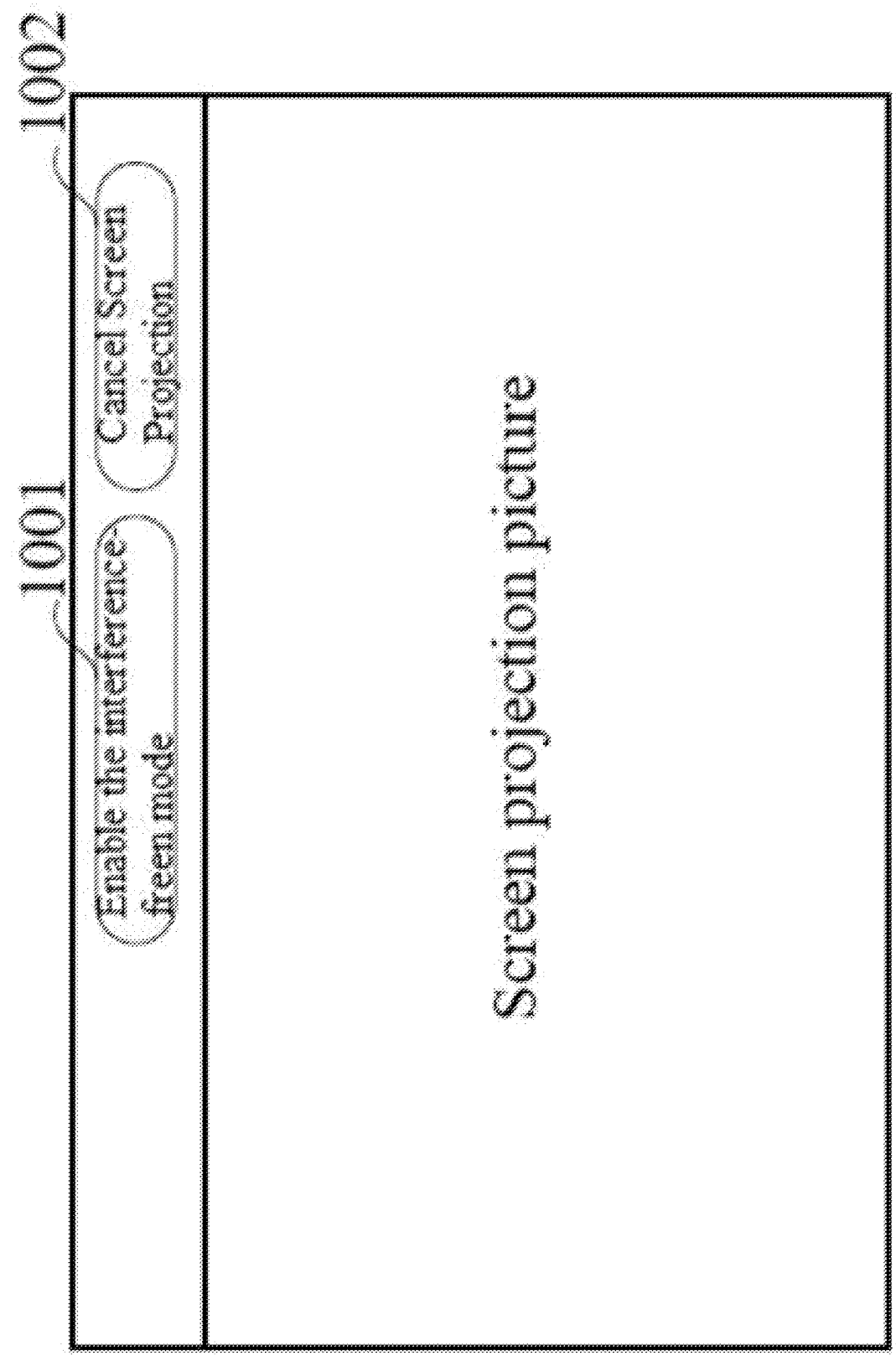
FIG. 10 is another schematic diagram of a user interface according to an embodiment of the present disclosure.

As shown in FIG. 10, the user interface A of the user terminal A may include a first element 1001. For example, as shown in FIG. 10, "Enable the Interference-free Mode" may be displayed on the first element, but the present disclosure is not limited thereto. In some embodiments, the user interface A of the user terminal A as shown in FIG. 10 further includes a third element 1002 for canceling the screen projection. If the user performs a third operation on the third element, the user terminal A sends, in response to the third operation, the request information for canceling the screen projection to the conference white board. "Cancel the Screen Projection" may be displayed on the first element, but the present disclosure is not limited thereto.

9. After receiving the request information for triggering the interference-free mode, the conference white board judges whether the user terminal A is an apparatus that is performing screen projection.

In some embodiments, the conference white board reads the stored flag bit A of the user terminal A, determines, according to the flag bit A being true, that the user terminal A is the apparatus that is performing screen projection, and accepts a request for triggering the interference-free mode of the user terminal A and enables the interference-free mode.

10. The conference white board sets the flag bit B of the user terminal A to be true, and sends response information indicating that the interference-free mode has been enabled to the user terminal A, to notify the user terminal A that the interference-free mode has been enabled.

In some embodiments, the conference white board outputs second interface display information, and the second interface display information includes information for prompting that the interference-free mode has been enabled.

Figure 11:
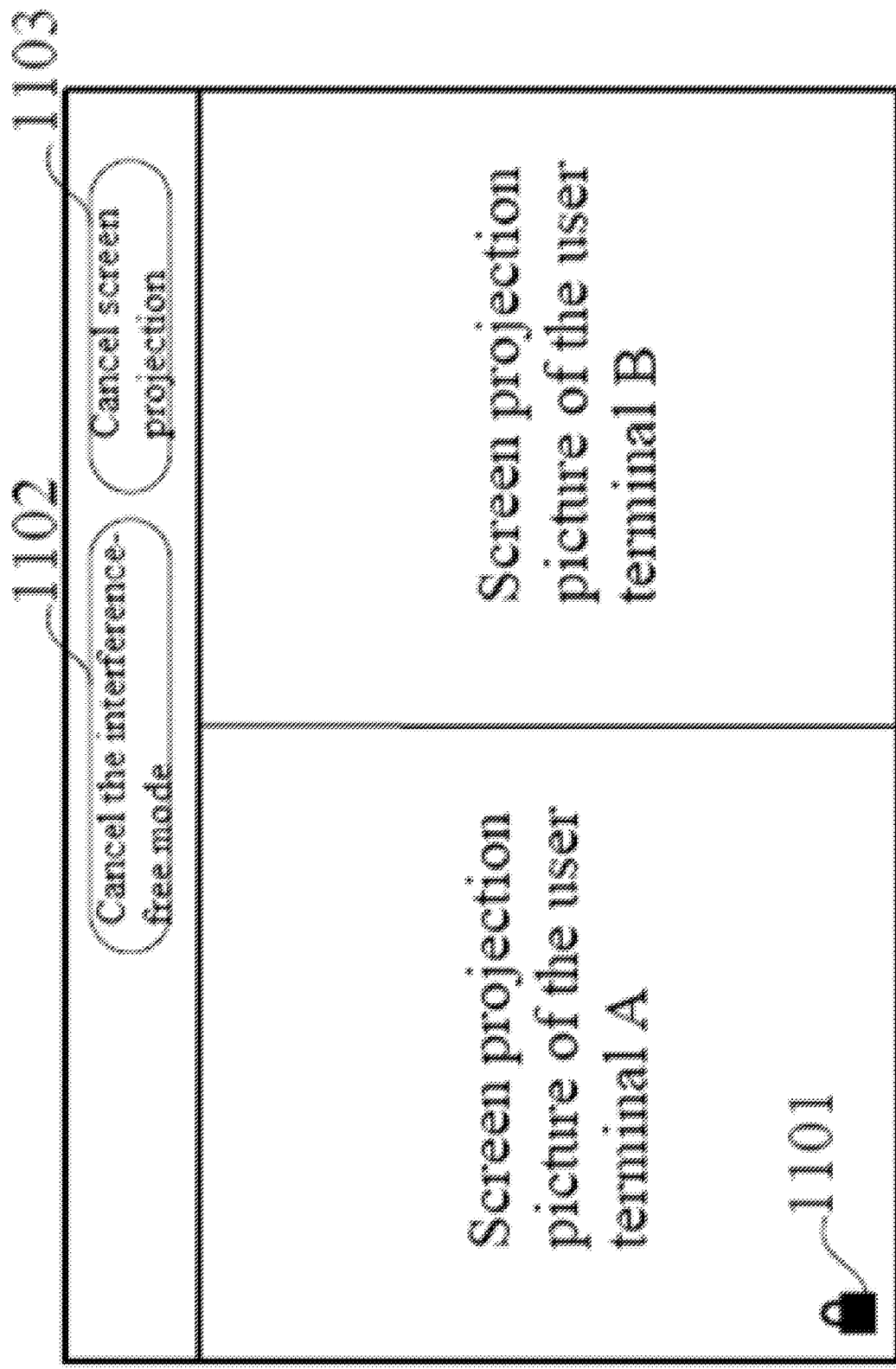
FIG. 11 is another schematic diagram of a user interface according to an embodiment of the present disclosure.

For example, as shown in FIG. 11, the screen display of the conference white board may display picture information of the user terminal A and picture information of the user terminal B in the form of split screens. The information for prompting that the interference-free mode has been enabled may be implemented through a lock element 1101 as shown in FIG. 11. However, the present disclosure is not limited thereto, and the prompt information may be in the form of text. In some embodiments, the menu or the pull-down menu of the conference white board also includes an element 1102 for canceling the interference-free mode and an element 1103 for canceling the screen projection as shown in FIG. 11.

11. A user terminal D (not shown in FIG. 8) outside the conference room establishes a connection with the conference white board in the conference scenario 800, and sends screen projection request information to the conference white board, or sends first request information to the conference white board to request to enable the interference-free mode.

After receiving the screen projection request information from the user terminal D, the conference white board reads the stored flag bit B corresponding to the connected screen projection sending end, wherein if the flag bit B of the user terminal A is "true," the conference white board sends response information for refusing the screen projection request to the user terminal D. In some embodiments, after receiving the request information for triggering the interference-free mode of the user terminal D, the conference white board reads the flag bit A of the user terminal D as false, determines that the user terminal D is not a screen projection sending end that is performing screen projection, and sends response information for refusing to enable the interference-free mode to the user terminal D. By the screen projection control method according to the present disclosure, it is possible to avoid a situation in which the conference order is disturbed.

12. The user may perform a fourth operation on an element which is in the user interface A of the user terminal A and used for canceling the interference-free mode, and in response to the fourth operation, the user terminal A sends request information for canceling the interference-free mode to the conference white board.

13. After receiving the request information for canceling the interference-free mode, if the conference white board reads the flag bit B corresponding to the user terminal A as true, it sets the flag bit B corresponding to the user terminal A to false. And if the conference white board reads the flag bit B of the user terminal that is performing screen projection (i.e., the flag bit B of the user terminal B) as false, and determines that all the flag bits B of the user terminals that are performing screen projection are "false," it receives the request for canceling the interference-free mode of the user terminal A.

14. The conference white board sends response information indicating that the interference-free mode has been canceled to the user terminal A.

The method according to the embodiment of the present disclosure is described above in detail with reference to FIG. 3 to FIG. 11. The following describes a screen projection control device according to the embodiment of the present disclosure.

Figure 12:
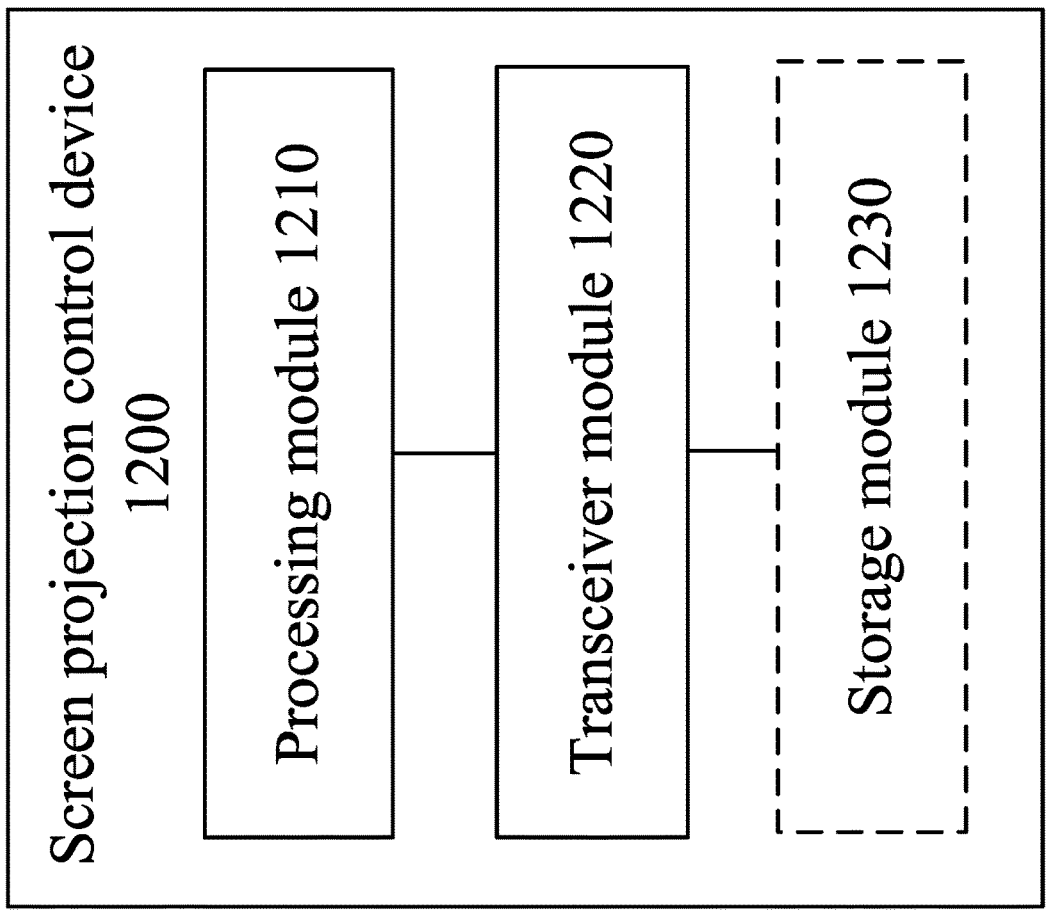
FIG. 12 is a schematic diagram of structures of a screen projection control device according to an embodiment of the present disclosure.

Referring to FIG. 12, a schematic diagram of structures of a screen projection control device according to an exemplary embodiment of the present disclosure is shown. The screen projection control device may be implemented as all or a part of an interactive white board through software, hardware, or a combination thereof. The device includes a transceiver module 1220, a processing module 1210, and a storage module 1230.

The transceiver module is configured to receive screen projection request information from a first screen projection sending end; the processing module is configured to determine, according to the screen projection request information, whether a third screen projection sending end that has triggered a screen projection interference-free mode exists in at least one second screen projection sending end that is performing screen projection, wherein the interference-free mode includes stopping accepting a screen projection request; if the processing module determines that the third screen projection sending end exists, the transceiver module is further configured to send response information for refusing the screen projection request to the first screen projection sending end.

In some embodiments, each connected screen projection sending end corresponds to a piece of first state information, the first state information is used for indicating that a corresponding screen projection sending end is or is not in a screen projecting state, and the processing module is further configured to determine, according to the first state information corresponding to at least one connected screen projection sending end, the at least one second screen projection sending end in the at least one connected screen projection sending end.

In some embodiments, each connected screen projection sending end corresponds to a piece of second state information, the second state information is used for indicating that a corresponding screen projection sending end has triggered or not triggered the interference-free mode, wherein the connected screen projection sending end includes the at least one second screen projection sending end, and the processing module is configured to determine, according to the second state information corresponding to the at least one second screen projection sending end, whether the third screen projection sending end that has triggered the interference-free mode exists in the at least one second screen projection sending end.

In some embodiments, if the third screen projection sending end that has triggered the interference-free mode does not exist in the at least one second screen projection sending end, the processing module is further configured to determine to accept the screen projection request of the first screen projection sending end; the transceiver module is further configured to receive screen projection data of the first screen projection sending end and screen projection data of the at least one second screen projection sending end.

In some embodiments, the processing module is configured to set the first state information corresponding to the first screen projection sending end to indicate that the first screen projection sending end is in the screen projecting state; and/or the transceiver module is further configured to send response information for accepting the screen projection request to the first screen projection sending end.

In some embodiments, before the transceiver module receives the screen projection request information from the first screen projection sending end, the transceiver module is further configured to receive request information for triggering the interference-free mode from the third screen projection sending end; the processing module is further configured to determine, according to the request information for triggering the interference-free mode, whether the first state information corresponding to the third screen projection sending end indicates that the third screen projection sending end is in the screen projecting state; if the first state information corresponding to the third screen projection sending end indicates that the third screen projection sending end is in the screen projecting state, the processing module is further configured to determine to enable the interference-free mode.

In some embodiments, each connected screen projection sending end corresponds to a piece of second state information, the second state information is used for indicating that a corresponding screen projection sending end has triggered or not triggered the interference-free mode, wherein the connected screen projection sending end includes the at least one second screen projection sending end, and the processing module is configured to set the second state information corresponding to the third screen projection sending end to indicate that the third screen projection sending end has triggered the interference-free mode, and/or the transceiver module is further configured to send response information indicating that the interference-free mode has been enabled to the third screen projection sending end.

In some embodiments, the transceiver module is further configured to receive request information for canceling the interference-free mode from the third screen projection sending end; the processing module is further configured to set, in response to the request information for canceling the interference-free mode, the second state information corresponding to the third screen projection sending end to indicate that the third screen projection sending end has not triggered the interference-free mode.

In some embodiments, the processing module is further configured to determine, in response to the request information for canceling the interference-free mode, whether the second state information corresponding to the at least one second screen projection sending end includes second state information indicating that the interference-free mode has been triggered, if the second state information indicating that the interference-free mode has been triggered is not included, the processing module is further configured to exit the interference-free mode, and the transceiver module is further configured to send response information indicating that the interference-free mode has been canceled to the third screen projection sending end; if the second state information indicating that the interference-free mode has been triggered is included, the transceiver module is further configured to send response information for refusing to cancel the interference-free mode to the third screen projection sending end.

It should be noted that, although when the screen projection control device according to the above embodiment executes the screen projection control method, only the division of the above functional modules is used as an example for description, in actual application, the above functions may be allocated to different functional modules for completion as required, that is, the internal structure of the apparatus is divided into different functional modules to complete all or a part of the functions described above. In addition, embodiments of the screen projection control device and the screen projection control method according to the above embodiment belong to the same concept, and the implementation process thereof is detailed in the method embodiment, and will not be repeated here.

Figure 13:
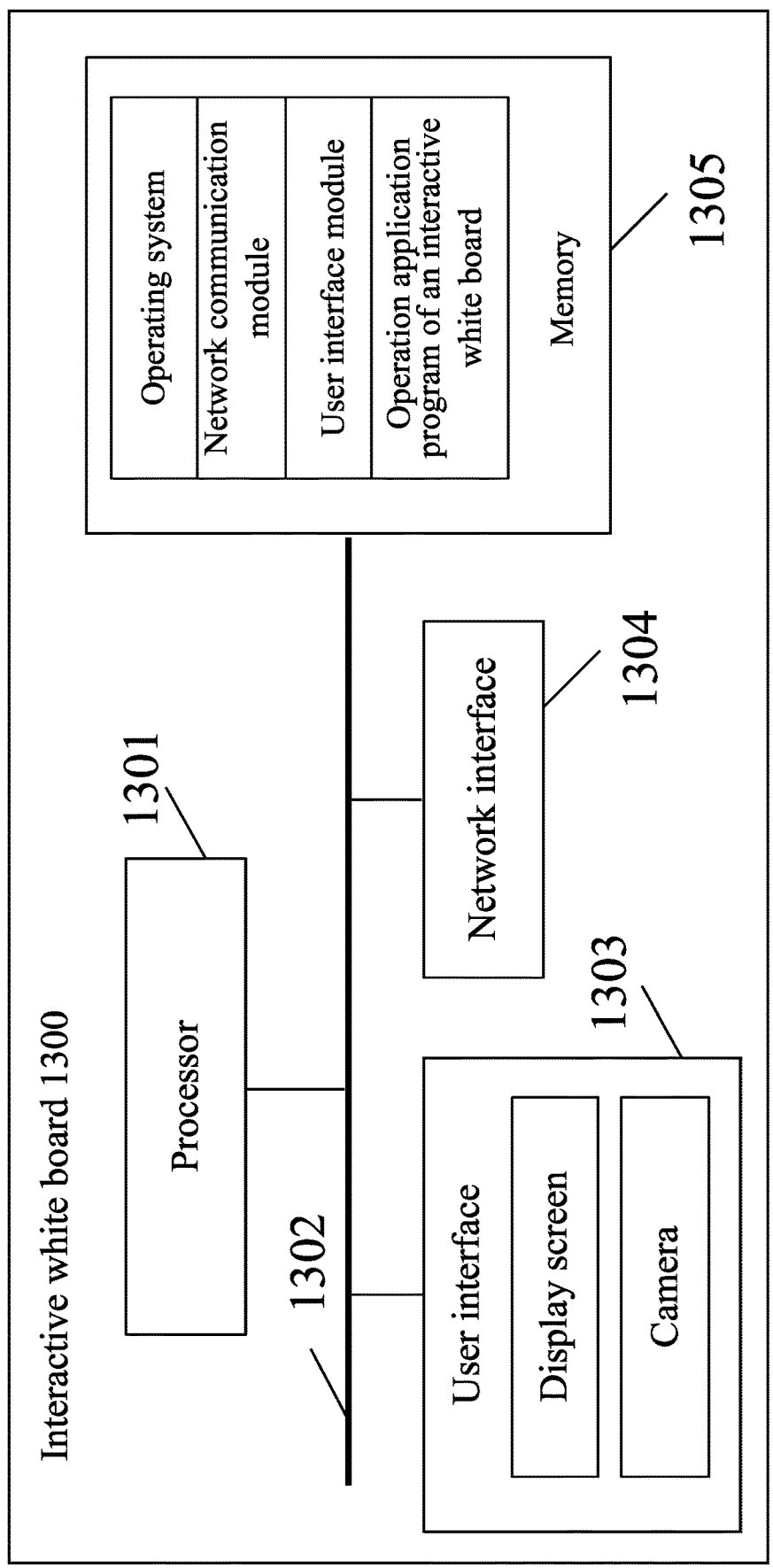
FIG. 13 is a schematic diagram of structures of an interactive white board according to an embodiment of the present disclosure.

Referring to FIG. 13, a schematic diagram of structures of an interactive white board is provided according to an embodiment of the present disclosure. As shown in FIG. 13, the interactive white board 1300 may include at least one processor 1301, at least one network interface 1304, a user interface 1303, a memory 1305, and at least one communication bus 1302, wherein:

The communication bus 1302 is configured to implement connection communications between these components.

The user interface 1303 may include a display screen and a camera, and in some embodiments, the user interface 1303 may further include a standard wired interface and wireless interface.

The network interface 1304 may include a standard wired interface and wireless interface (such as a Wi-Fi interface).

The processor 1301 may include one or more processing cores. The processor 1301 connects various parts within the entire interactive white board 1300 using various interfaces and lines, and executes various functions of the interactive white board 1300 and processes data by running or executing instructions, programs, code sets, or instruction sets stored in the memory 1305 and invoking data stored in the memory 1305. In some embodiments, the processor 1301 may be implemented by using at least one hardware form of Digital Signal Processing (DSP), a Field-Programmable Gate Array (FPGA), and a Programmable Logic Array (PLA). The processor 1301 may integrate one or a combination of several of a Central Processing Unit (CPU), a Graphics Processing Unit (GPU), a modem, and the like. Wherein the CPU mainly processes an operating system, a user interface, an application program, and the like; the GPU is configured to be responsible for rendering and drawing of content to be displayed on the display screen; the modem is configured to handle wireless communication. It will be appreciated that the above modem may also not be integrated into the processor 1301, but may be implemented by using a chip alone.

The memory 1305 may include a Random Access Memory (RAM) or may include a Read-Only Memory (ROM). In some embodiments, the memory 1305 includes a non-transitory computer-readable storage medium. The memory 1305 may be used to store instructions, programs, codes, code sets, or instruction sets. The memory 1305 may include a program storage area and a data storage area, wherein the program storage area may store instructions for implementing an operating system, instructions for at least one function (such as a touch function, a sound playing function, an image playing function, and the like), instructions for implementing the above various method embodiments, and the like; the data storage area may store data involved in the above various method embodiments, and the like. The memory 1305 may also be at least one storage device located away from the aforementioned processor 1301. As shown in FIG. 13, the memory 1305 serving as a computer storage medium may include an operating system, a network communication module, a user interface module, and an operation application program of an interactive white board.

In the interactive white board 1300 shown in FIG. 13, the user interface 1303 is mainly configured to provide an input interface for the user, and acquire data input by the user; and the processor 1301 may be configured to invoke the operation application program of the interactive white board stored in the memory 1305 and execute the following operations:

receiving screen projection request information from a first screen projection sending end;

determining, according to the screen projection request information, whether a third screen projection sending end that has triggered a screen projection interference-free mode exists in at least one second screen projection sending end that is performing screen projection, wherein the interference-free mode includes stopping accepting a screen projection request;

if the third screen projection sending end exists, sending response information for refusing the screen projection request to the first screen projection sending end.

In some embodiments, determining, according to the first state information corresponding to the connected screen projection sending end, the at least one second screen projection sending end in the connected screen projection sending end.

In some embodiments, determining, according to the second state information corresponding to the at least one second screen projection sending end, whether the third screen projection sending end that has triggered the interference-free mode exists in the at least one second screen projection sending end.

In some embodiments, if the third screen projection sending end that has triggered the interference-free mode does not exist in the at least one second screen projection sending end, accepting the screen projection request of the first screen projection sending end;

receiving screen projection data of the first screen projection sending end and screen projection data of the at least one second screen projection sending end.

In some embodiments, setting the first state information corresponding to the first screen projection sending end to indicate that the first screen projection sending end is in the screen projecting state; and/or sending response information for accepting the screen projection request to the first screen projection sending end.

In some embodiments, before receiving the screen projection request information from the first screen projection sending end, the method further includes:

receiving request information for triggering the interference-free mode from the third screen projection sending end;

determining, according to the request information for triggering the interference-free mode, whether the first state information corresponding to the third screen projection sending end indicates that the third screen projection sending end is in the screen projecting state;

if the first state information corresponding to the third screen projection sending end indicates that the third screen projection sending end is in the screen projecting state, enabling the interference-free mode.

In some embodiments, setting the second state information corresponding to the third screen projection sending end to indicate that the third screen projection sending end has triggered the interference-free mode; and/or sending response information indicating that the interference-free mode has been enabled to the third screen projection sending end.

In some embodiments, receiving request information for canceling the interference-free mode from the third screen projection sending end;

setting the second state information corresponding to the third screen projection sending end to indicate that the third screen projection sending end has not triggered the interference-free mode.

In some embodiments, determining whether the second state information corresponding to the at least one second screen projection sending end includes second state information indicating that the interference-free mode has been triggered, if the second state information indicating that the interference-free mode has been triggered is not included, exiting the interference-free mode, and sending response information indicating that the interference-free mode has been canceled to the third screen projection sending end;

if the second state information indicating that the interference-free mode has been triggered is included, sending response information for refusing to cancel the interference-free mode to the third screen projection sending end.

It should be noted that, due to space limitation, the specification of the present disclosure does not enumerate all optional embodiments, and after reading the specification of the present disclosure, those skilled in the art should be able to conceive that any combination of technical features may constitute an optional embodiment as long as the technical features are not contradictory to each other.

An embodiment of the present disclosure further provides a computer storage medium, and the computer storage medium may store a plurality of instructions adapted to be loaded by a processor and execute the steps of the method of the embodiment shown in FIG. 3 to FIG. 11. For a specific execution process, reference may be made to the specific description of the embodiment shown in FIG. 3 to FIG. 11, and details are not repeated here.

The device on which the storage medium is located may be an interactive white board.

The hardware part of the interactive white board may be composed of a touch display module, an intelligent processing system (including a controller) and other parts, which is integrated together by an overall structure, and also supported by a special software system. Wherein the touch display module includes a display screen, a touch component and a backlight component, the backlight component is configured to provide a backlight light source for the display screen, the display screen generally adopts a liquid crystal display device for picture display, and the touch component is disposed on the display screen or disposed at the front of the display screen, and is used for collecting touch operation data of a user, and sending the collected touch operation data to the intelligent processing system for processing.

In actual use, picture data is displayed on the display screen of the interactive white board. When the user clicks content displayed on the display screen with a touch object such as a finger or a stylus (for example, clicks a graphic button displayed on the display screen), the touch component of the interactive white board will collect touch data, so that the touch component converts the touch data into coordinate data of a touch point and sends it to the intelligent processing system, or sends the touch data to the intelligent processing system, and the intelligent processing system converts it into coordinate data of the touch point. After obtaining the coordinate data of the touch point, the intelligent processing system realizes a corresponding control operation according to a preset program, drives a change in display content of the display screen, and realizes operation effects of diversified display.

According to the technical principles, touch components can be divided into five basic types: touch component using vector pressure sensing technology, touch component using resistance technology, touch component using capacitance technology, touch screen using electromagnetic technology, touch component using infrared technology, and touch component using surface acoustic wave technology. According to the working principle of touch components and the medium for transmitting information, touch components can be divided into four types: resistance type, capacitive induction type, electromagnetic induction type, infrared type and surface acoustic wave type.

When the user touches the display screen with a finger or a stylus, the touch component can collect the data of the touch point and send it to the intelligent processing system, and then implement different function applications with the software built in the intelligent processing system, so as to realize the touch control of the intelligent processing system.

The "screen" or "large screen" mentioned in the present disclosure refers to the display screen of the interactive white board; the interactive white board displaying an interface refers to the display screen of the interactive white board displaying the interface.

Those skilled in the art should understand that the embodiment of the present disclosure may be provided as a method, a system, or a computer program product. Accordingly, the present disclosure may take the form of an entirely hardware embodiment, an entirely software embodiment, or an embodiment combining software and hardware aspects. Moreover, the present disclosure may take the form of a computer program product implemented on one or more computer-usable storage media (including, but not limited to, a magnetic disk memory, a CD-ROM, an optical memory, and the like) in which computer-usable program code is contained.

The present disclosure is described with reference to flowcharts and/or block diagrams of methods, apparatus (systems), and computer program products according to embodiments of the present disclosure. It should be appreciated that each flow and/or block in the flowcharts and/or block diagrams and the combination of the flows and/or blocks in the flowcharts and/or block diagrams may be implemented by computer program instructions. These computer program instructions may be provided to a processor of a general purpose computer, a special purpose computer, an embedded processor, or other programmable data processing apparatus to generate a machine such that instructions executed by the processor of the computer or other programmable data processing apparatus produce a device for implementing the functions specified in one or more flows of the flow charts and/or one or more blocks of the block diagrams.

These computer program instructions may also be stored in a computer-readable memory capable of directing a computer or other programmable data processing apparatus to operate in a particular manner, such that instructions stored in the computer-readable memory produce manufactures including an instruction device that implements the functions specified in one or more flows of the flow charts and/or one or more blocks of the block diagrams.

These computer program instructions may also be loaded onto a computer or other programmable data processing apparatus, such that a series of operation steps are executed on the computer or other programmable apparatus to generate computer-implemented processing, thus the instructions executed on the computer or other programmable apparatus provide steps of the functions specified in one or more flows of the flow charts and/or one or more blocks of the block diagrams.

In a typical configuration, a computing apparatus includes one or more processors (CPUs), an input/output interface, a network interface, and a memory.

The memory may include a non-permanent memory, a random access memory, a non-volatile memory and/or other forms in a computer readable medium, such as a Read-Only Memory (ROM) or a flash memory (flash RAM). The memory is an example of a computer readable medium.

A computer readable medium, including permanent and non-permanent, removable and non-removable medium, may implement information storage by any method or technology. Information may be computer-readable instructions, data structures, program modules, or other data. Examples of storage medium for a computer include, but not limited to, a Phase-change Random Access Memory (PRAM), a Static Random Access Memory (SRAM), a Dynamic Random Access Memory (DRAM), other types of Random Access Memory (RAM), a Read-Only Memory (ROM), an Electrically Erasable Programmable Read-Only Memory (EEPROM), a flash memory or other memory technologies, a Compact Disc Read-Only Memory (CD-ROM), a Digital Versatile Disc (DVD) or other optical storage, a magnetic cassette tape, a magnetic tape magnetic disk storage or other magnetic storage apparatus, or any other non-transmission medium that may be used to store information accessible by a computing apparatus. As defined herein, a computer readable medium does not include a transitory medium, such as a modulated data signal and carrier wave.

It should also be noted that the terms "include," "comprise," or any other variation thereof are intended to cover a non-exclusive inclusion, so that a process, a method, a commodity, or an apparatus that includes a series of elements not only includes those elements, but also includes other elements that are not explicitly listed, or further includes inherent elements of the process, the method, the commodity, or the apparatus. Without further limitation, an element limited by "include a . . . " does not exclude that other elements exist in a process, a method, a commodity, or an apparatus that includes the element.

The above are merely embodiments of the present disclosure, and are not intended to limit the present disclosure. For those skilled in the art, various modifications and variations may be made to the present disclosure. Any modifications, equivalent replacements, improvements, etc. made within the spirit and principle of the present disclosure shall fall within the scope of the claims of the present disclosure.

What is claimed is:

1. A screen projection control method, comprising:
receiving screen projection request information from a first screen projection sending end;
determining, according to the screen projection request information, whether a third screen projection sending end that has triggered an interference-free mode exists in at least one second screen projection sending end that is performing screen projection, wherein the interference-free mode comprises stopping accepting a screen projection request; and
in response to the third screen projection sending end that has triggered the interference-free mode existing in the at least one second screen projection sending end that is performing screen projection, sending response information for refusing the screen projection request to the first screen projection sending end, wherein each connected screen projection sending end corresponds to a piece of first state information, the first state information is used for indicating that a corresponding screen projection sending end is or is not in a screen projecting state, and the method further comprises:

determining, according to the first state information corresponding to the connected screen projection sending end, the at least one second screen projection sending end is included in the connected screen projection sending end.

2. The screen projection control method according to claim 1, wherein each connected screen projection sending end corresponds to a piece of second state information, the second state information is used for indicating that a corresponding screen projection sending end has triggered or not triggered the interference-free mode, the at least one second screen projection sending end is included in the connected screen projection sending end, and wherein determining whether the third screen projection sending end that has triggered the interference-free mode exists in the at least one second screen projection sending end that is performing screen projection comprises:

determining, according to the second state information corresponding to the at least one second screen projection sending end, whether the third screen projection sending end that has triggered the interference-free mode exists in the at least one second screen projection sending end.

3. The screen projection control method according to claim 1, further comprising:

in response to the third screen projection sending end that has triggered the interference-free mode not existing in the at least one second screen projection sending end that is performing screen projection, accepting the screen projection request of the first screen projection sending end; and receiving screen projection data of the first screen projection sending end and screen projection data of the at least one second screen projection sending end.

4. The screen projection control method according to claim 3, wherein accepting the screen projection request of the first screen projection sending end comprises:

setting the first state information corresponding to the first screen projection sending end to indicate that the first screen projection sending end is in the screen projecting state; or sending response information for accepting the screen projection request to the first screen projection sending end.

5. The screen projection control method according to claim 1, wherein before receiving the screen projection request information from the first screen projection sending end, the method further comprises:

receiving request information for triggering the interference-free mode from the third screen projection sending end;

determining, according to the request information for triggering the interference-free mode, whether the first state information corresponding to the third screen projection sending end indicates that the third screen projection sending end is in the screen projecting state; and in response to the first state information corresponding to the third screen projection sending end indicating that the third screen projection sending end is in the screen projecting state, enabling the interference-free mode.

6. The screen projection control method according to claim 5, wherein each connected screen projection sending end corresponds to a piece of second state information, the second state information is used for indicating that a corresponding screen projection sending end has triggered or not triggered the interference-free mode, the at least one second screen projection sending end is included in the connected screen projection sending end, and wherein enabling the interference-free mode further comprises:

setting the second state information corresponding to the third screen projection sending end to indicate that the third screen projection sending end has triggered the interference-free mode; or sending response information indicating that the interference-free mode has been enabled to the third screen projection sending end.

7. The screen projection control method according to claim 6, further comprising:

receiving request information for canceling the interference-free mode from the third screen projection sending end; and setting the second state information corresponding to the third screen projection sending end to indicate that the third screen projection sending end has not triggered the interference-free mode.

8. The screen projection control method according to claim 7, further comprising:

determining whether the second state information corresponding to the at least one second screen projection sending end includes second state information indicating that the interference-free mode has been triggered;

in response to the second state information indicating that the interference-free mode has been triggered not being included, exiting the interference-free mode, and sending response information indicating that the interference-free mode has been canceled to the third screen projection sending end; and in response to the second state information indicating that the interference-free mode has been triggered being included, sending response information for refusing to cancel the interference-free mode to the third screen projection sending end.

9. A screen projection control device, comprising:

a memory storing computer-readable instructions; and a processor coupled to the memory and configured to execute the computer-readable instructions, wherein the computer-readable instructions, when executed by the processor, cause the processor to perform operations comprising:

receiving screen projection request information from a first screen projection sending end;

determining, according to the screen projection request information, whether a third screen projection sending end that has triggered an interference-free mode exists in at least one second screen projection sending end that is performing screen projection, wherein the interference-free mode comprises stopping accepting a screen projection request; and in response to the third screen projection sending end that has triggered the interference-free mode existing in the at least one second screen projection sending end that is performing screen projection, sending response information for refusing the screen projection request to the first screen projection sending end, wherein each connected screen projection sending end corresponds to a piece of first state information, the first state information is used for indicating that a corresponding screen projection sending end is or is not in a screen projecting state, and the operations further comprise:

determining, according to the first state information corresponding to the connected screen projection sending end, the at least one second screen projection sending end is included in the connected screen projection sending end.

10. The screen projection control device according to claim 9, wherein each connected screen projection sending end corresponds to a piece of second state information, the second state information is used for indicating that a corresponding screen projection sending end has triggered or not triggered the interference-free mode, the at least one second screen projection sending end is included in the connected screen projection sending end, and wherein determining whether the third screen projection sending end that has triggered the interference-free mode exists in the at least one second screen projection sending end that is performing screen projection comprises:

determining, according to the second state information corresponding to the at least one second screen projection sending end, whether the third screen projection sending end that has triggered the interference-free mode exists in the at least one second screen projection sending end.

11. The screen projection control device according to claim 9, wherein the operations further comprise:

in response to the third screen projection sending end that has triggered the interference-free mode not existing in the at least one second screen projection sending end that is performing screen projection, accepting the screen projection request of the first screen projection sending end; and receiving screen projection data of the first screen projection sending end and screen projection data of the at least one second screen projection sending end.

12. The screen projection control device according to claim 11, wherein accepting the screen projection request of the first screen projection sending end comprises:

setting the first state information corresponding to the first screen projection sending end to indicate that the first screen projection sending end is in the screen projecting state; or sending response information for accepting the screen projection request to the first screen projection sending end.

13. The screen projection control device according to claim 9, wherein before receiving the screen projection request information from the first screen projection sending end, the operations further comprise:

receiving request information for triggering the interference-free mode from the third screen projection sending end;

determining, according to the request information for triggering the interference-free mode, whether the first state information corresponding to the third screen projection sending end indicates that the third screen projection sending end is in the screen projecting state; and in response to the first state information corresponding to the third screen projection sending end indicating that the third screen projection sending end is in the screen projecting state, enabling the interference-free mode.

14. The screen projection control device according to claim 13, wherein each connected screen projection sending end corresponds to a piece of second state information, the second state information is used for indicating that a corresponding screen projection sending end has triggered or not triggered the interference-free mode, the at least one second screen projection sending end is included in the connected screen projection sending end, and wherein enabling the interference-free mode further comprises:

setting the second state information corresponding to the third screen projection sending end to indicate that the third screen projection sending end has triggered the interference-free mode; or sending response information indicating that the interference-free mode has been enabled to the third screen projection sending end.

15. The screen projection control device according to claim 14, wherein the operations further comprise:

receiving request information for canceling the interference-free mode from the third screen projection sending end; and setting the second state information corresponding to the third screen projection sending end to indicate that the third screen projection sending end has not triggered the interference-free mode.

16. The screen projection control device according to claim 15, wherein the operations further comprise:

determining whether the second state information corresponding to the at least one second screen projection sending end includes second state information indicating that the interference-free mode has been triggered;

in response to the second state information indicating that the interference-free mode has been triggered not being included, exiting the interference-free mode, and sending response information indicating that the interference-free mode has been canceled to the third screen projection sending end; and in response to the second state information indicating that the interference-free mode has been triggered being included, sending response information for refusing to cancel the interference-free mode to the third screen projection sending end.

17. A non-transitory computer-readable medium storing computer readable instructions that, when executed by a processor, cause the processor to perform operations comprising:

receiving screen projection request information from a first screen projection sending end;

determining, according to the screen projection request information, whether a third screen projection sending end that has triggered an interference-free mode exists in at least one second screen projection sending end that is performing screen projection, wherein the interference-free mode comprises stopping accepting a screen projection request; and in response to the third screen projection sending end that has triggered the interference-free mode existing in the at least one second screen projection sending end that is performing screen projection, sending response information for refusing the screen projection request to the first screen projection sending end, wherein each connected screen projection sending end corresponds to a piece of first state information, the first state information is used for indicating that a corresponding screen projection sending end is or is not in a screen projecting state, and the operations further comprise:

determining, according to the first state information corresponding to the connected screen projection sending end, the at least one second screen projection sending end is included in the connected screen projection sending end.

18. The non-transitory computer-readable medium according to claim 17, wherein each connected screen projection sending end corresponds to a piece of second state information, the second state information is used for indicating that a corresponding screen projection sending end has triggered or not triggered the interference-free mode, the at least one second screen projection sending end is included in the connected screen projection sending end, and wherein determining whether the third screen projection sending end that has triggered the interference-free mode exists in the at least one second screen projection sending end that is performing screen projection comprises:

determining, according to the second state information corresponding to the at least one second screen projection sending end, whether the third screen projection sending end that has triggered the interference-free mode exists in the at least one second screen projection sending end.

19. The non-transitory computer-readable medium according to claim 17, wherein the operations further comprise:

in response to the third screen projection sending end that has triggered the interference-free mode not existing in the at least one second screen projection sending end that is performing screen projection, accepting the screen projection request of the first screen projection sending end; and receiving screen projection data of the first screen projection sending end and screen projection data of the at least one second screen projection sending end.

\* \* \* \* \*